United States Patent
Esswie

(10) Patent No.: US 12,218,887 B2
(45) Date of Patent: Feb. 4, 2025

(54) TIME DIVISION FULL DUPLEXING INTER-NODE INTERFERENCE MANAGEMENT IN A RADIO ACCESS NETWORK

(71) Applicant: Dell Products, L.P., Round Rock, TX (US)

(72) Inventor: Ali Esswie, Montreal (CA)

(73) Assignee: DELL PRODUCTS L.P., Round Rock, TX (US)

( * ) Notice: Subject to any disclaimer, the term of this patent is extended or adjusted under 35 U.S.C. 154(b) by 355 days.

(21) Appl. No.: 17/892,094

(22) Filed: Aug. 21, 2022

(65) Prior Publication Data

US 2024/0063992 A1 Feb. 22, 2024

(51) Int. Cl.
*H04L 5/14* (2006.01)
*H04W 72/1273* (2023.01)
*H04W 72/541* (2023.01)

(52) U.S. Cl.
CPC ........... *H04L 5/14* (2013.01); *H04W 72/1273* (2013.01); *H04W 72/541* (2023.01)

(58) Field of Classification Search
CPC .... H04L 5/14; H04L 5/1469; H04W 72/1273; H04W 72/541; H04W 92/20
See application file for complete search history.

(56) References Cited

U.S. PATENT DOCUMENTS

| | | | |
|---|---|---|---|
| 2020/0288523 A1* | 9/2020 | Patil | H04W 80/02 |
| 2022/0030495 A1* | 1/2022 | Qiao | H04W 60/04 |
| 2022/0052882 A1* | 2/2022 | Wang | H04L 5/1423 |
| 2023/0064251 A1* | 3/2023 | Korhonen | H04B 7/0695 |
| 2023/0118780 A1* | 4/2023 | Abotabl | G01S 5/0063 455/456.1 |
| 2023/0217477 A1* | 7/2023 | Ibrahim | H04W 72/541 370/347 |
| 2023/0421336 A1* | 12/2023 | Zhang | H04L 5/14 |

(Continued)

OTHER PUBLICATIONS

Technical specifications (TS) 38.300—"5G; NR; NR and NG-RAN Overall description; Stage-2" 3GPP TS 38.300 version 16.4.0 Release 16, Jan. 2021, 151 pages.

(Continued)

*Primary Examiner* — Christine Ng
(74) *Attorney, Agent, or Firm* — Amin, Turocy & Watson, LLP

(57) ABSTRACT

A set of full duplex sub-band patterns, which each define downlink or uplink full duplex frequency sub-band resources during a TDD radio timing unit, are configured to RANs that are neighbors to one another. A RAN determines a traffic load, selects a full duplex sub-band pattern to accommodate the traffic load, and transmits an index associated with the selected pattern to neighboring RANs over a backhaul link. Selecting the pattern may be based on potential CLI. A neighboring RAN may adopt the selected pattern for downlink transmission. A RAN may select a compression subspace plan from among configured subspace plans and transmit, via a backhaul link, an index associated with the compression plan to neighboring RANs for use thereby in performing downlink transmission to minimize CLI. A RAN may transmit, via a backhaul link, an index associated with configured aggressor RAN action based on an uplink traffic or channel type.

20 Claims, 15 Drawing Sheets

(56) References Cited

U.S. PATENT DOCUMENTS

2024/0014996 A1* 1/2024 Zhang .................. H04L 5/0094
2024/0056264 A1* 2/2024 Abdelghaffar ........ H04L 5/0053

OTHER PUBLICATIONS

Technical specifications (TS) 38.331—"5G; NR; Radio Resource Control (RRC); Protocol specification", 3GPP TS 38.331 version 16.1.0 Release 16, Jul. 2020, 886 pages.
Technical specifications (TS) 38.211—"5G; NR; Physical channels and modulation", 3GPP TS 38.211 version 16.2.0 Release 16, Jul. 2020, 136 pages.
Technical specifications (TS) 38.304—"5G; NR; User Equipment (UE) procedures in idle mode and in RRC Inactive state", 3GPP TS 38.304 version 16.1.0 Release 16, Jul. 2020, 41 pages.

\* cited by examiner

FIG. 13

- CLI Sub-band pattern indication: an index of the current active full duplex sub-band pattern and/or timing and frequency resources and/or pattern periodicity.

- CLI Sub-band information: including one or more sub-band indices during the current full duplex sub-band pattern and/or timing and frequency resources of the one or more sub-bands.

- CLI Sub-band-specific spatial subspace information: for each of the CLI sub-bands during active full duplex sub-band pattern, the index (from a predefined CLI spatial codebook) and/or explicit spatial coefficient vectors of the CLI subspace that minimizes the CLI channel.

- CLI spatial distance information: for each of the CLI sub-bands during active full duplex sub-band pattern, an index (from a predefined CLI spatial distance codebook) and/or explicit spatial distance, which is allowed over the associated full duplex sub-band.

1305

| Sub-band-specific victim channel | Aggressor coordination action |
|---|---|
| Uplink control channel (PUCCH) — 1406 | MUTE — 1411 |
| Uplink data channel (PUSCH) — 1407 | CLI spatial separation with an indicated certain spatial distance — 1412 |
| Uplink sounding reference signals (SRS) — 1408 | Transmission of a sequence-based payload, e.g., CSI-RS. — 1413 |

TIME DIVISION FULL DUPLEXING INTER-NODE INTERFERENCE MANAGEMENT IN A RADIO ACCESS NETWORK

BACKGROUND

The 'New Radio' (NR) terminology that is associated with fifth generation mobile wireless communication systems ("5G") refers to technical aspects used in wireless radio access networks ("RAN") that comprise several quality of service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary.

Dynamic Time division duplexing ("TDD") is a promising technology for Fifth Generation ("5G") NR and future wireless systems beyond 5G. Dynamic TDD offers greater performance merits than conventional frequency division duplexing ("FDD"), including utilizing channel reciprocity, reduced device-to-network signaling overhead, and dynamic adaptation of the network resources to the asymmetric downlink and uplink arrivals. However, fulfilling stringent latency and reliability performance targets in dynamic TDD networks is challenging, due to the exclusive availability of either a downlink or uplink transmission at a time. That is, unlike FDD, simultaneous uplink and downlink transmissions at the same frequency do not typically occur, which can lead to additional payload buffering delays. Full duplexing is a technology that may assign sub-bands of a bandwidth for different transmission directions. For example, within a TDD downlink slot or subframe, part of the bandwidth may be allocated to uplink transmissions, for example to carry device uplink feedback corresponding to received downlink transmissions during the TDD downlink slot, thus removing the waiting or buffering delay associated with waiting until a next uplink TDD slot to transmit the uplink feedback. However, implementing full duplex presents a problem of cross-link interference ("CLI"), which may occur due to the neighboring RAN nodes adopting opposite transmission directions (e.g., uplink vs. downlink) at the same time, over certain spectrum sub-bands. Such RAN-node-to-RAN-node CLI caused by downlink transmission from one RAN node has been demonstrated to severely impact uplink transmission to adjacent RAN nodes due to the significantly higher downlink power than uplink transmission power from a user equipment. Therefore, solutions for dynamically measuring and determining the strength of the severe CLI are desirable.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise receiving, by network equipment of a radio access network node (RAN) via a first backhaul interface link, a first full duplex sub band pattern; associating the first full duplex sub band pattern with a first category of uplink traffic and downlink traffic; receiving, by the network equipment, a first forthcoming traffic indication of first downlink traffic and first uplink traffic to be transmitted and received, respectively, by the RAN; determining that the first uplink traffic and the first downlink traffic correspond to the first category of uplink traffic and downlink traffic; and receiving the first uplink traffic according to the first full duplex sub band pattern. The first full duplex sub-band pattern may comprise indication of downlink timing unit and frequency resources and may comprise indication of uplink timing unit and frequency resources that are bounded by, or fall within, the indicated downlink timing unit resources and the indicated downlink frequency resources, respectively. The first full duplex sub-band pattern may comprise an indication of uplink timing unit and frequency resources and may comprise indication of downlink timing unit and frequency resources that are bounded by, or fall within, the indicated uplink timing unit resources and the indicated uplink frequency resources, respectively. The example method may further comprise scheduling, by the network equipment, receiving and transmitting of the first uplink traffic and first downlink traffic, respectively, according to the first full duplex sub band pattern during a time division duplexing timing unit.

The first full duplex sub band pattern may be one of a group of full duplex sub band patterns received by the network equipment; the group of full duplex sub band patterns may correspond to different respective categories of uplink traffic and downlink traffic.

The example embodiment method may further comprise receiving, by the network equipment, a second forthcoming traffic indication of second downlink traffic and second uplink traffic to be transmitted and received, respectively, by the network equipment; determining that the second uplink traffic and the second downlink traffic correspond to a second category of uplink traffic and downlink traffic; and receiving the second uplink traffic according to a second full duplex sub band pattern of the group of full duplex sub band patterns.

The network equipment of the RAN may comprise first network equipment of a first RAN, and the example embodiment may further comprise generating a first selected full duplex sub band pattern indication indicating that the first network equipment of the first RAN has determined that the first uplink traffic and the first downlink traffic correspond to the first category of uplink traffic and downlink traffic; and transmitting, via a second backhaul interface link, the first selected full duplex sub band pattern indication to second network equipment of a second RAN to be used by the second network equipment in determining scheduling of transmission of downlink traffic from the second network equipment.

In an embodiment, the second backhaul interface link may be a different backhaul interface link than the first backhaul interface link. In another embodiment the first selected sub band full duplex pattern indication may comprise an identifier associated with the first full duplex sub band pattern. In another embodiment, the first selected full duplex sub band pattern indication may comprise an identifier associated at least one of: a first pattern periodicity corresponding to the first full duplex sub band pattern or a first pattern validity period corresponding to the first full duplex sub band pattern.

In another embodiment of the example method the network equipment of the RAN may comprise first network equipment of a first RAN, and the example method may further comprise determining, by the first network equipment, at least one transmit beam corresponding to second network equipment of a second RAN that causes an interference of the receiving of uplink traffic by the first network equipment.

In an embodiment the first network equipment may determine at least one transmit beam corresponding to second network equipment of the second RAN that causes an interference of the receiving of uplink traffic by the first network equipment above a configured allowed interference level. Continuing with discussion, the example method, may further comprise the first network equipment determining, from one or more configured compression subspace plans, a first compression subspace plan that reduces the interference caused by the at least one transmit beam corresponding to the second network equipment.

The example method may further comprise determining a minimum allowable distance, relative to the first network equipment, corresponding to transmission by the second network equipment via the at least one transmit beam during an uplink sub band period of the first full duplex sub band pattern; and transmitting, to the second network equipment via a second backhaul interface link, first compression subspace plan information corresponding to the first compression subspace plan or minimum allowable distance information corresponding to the minimum allowable distance. The determining of the first compression subspace plan may be based on previously performed CLI measurements.

Previously performed CLI measurements may be performed by a victim RAN node subject to CLI from a neighboring aggressor RAN node requesting a CLI measurement procedure with the aggressor RAN. The CLI measurement request may include indications of time-unit and frequency resources to be used for CLI measurement, and uplink and downlink beam combinations, corresponding to the victim and aggressor, respectively. Upon acknowledgement by the aggressor to participate in measuring CLI according to information indicated, or specified, in the request, the victim may mute ongoing receiving or transmitting of signals using the time, frequency, and beam-combination resources specified in the request and measures CLI received from the aggressor during the time, at the frequencies, and via the beam-combinations requested in the request. The victim RAN may compile a CLI measurement report and transmit the report to the aggressor. The request and report may be transmitted via backhaul links.

During the previous CLI measurement procedure, a victim RAN may transmit to an aggressor RAN a request for cross link interference measurement parameter information corresponding to the first RAN. The victim RAN may be experiencing CLI during an uplink timing resource at a frequency, or using a frequency range, while the aggressor RAN is transmitting a downlink traffic portion at the same frequency, or frequency range. The request may comprise a request for the aggressor RAN node to participate in a measurement procedure with the victim RAN node, and the cross-link interference measurement parameter information may comprise information used to direct the aggressor RAN in transmitting a reference signal, or a test signal, for the measurement procedure. An example of a reference signal may comprise a sounding reference signal ("SRS"). The example method embodiment may comprise receiving, from the first node, acknowledgement of the cross link interference measurement parameter information—the acknowledgement may comprise indication of agreement by the aggressor RAN to participate in the requested CLI measurement procedure, or a modification of the parameters that were in the request if the aggressor RAN cannot participate in CLI measurement with the victim RAN according to all of the parameters included in the request. The previous CLI measurement procedure may comprise detecting a cross link interference test signal (the phrase 'test signal' may be referred to herein as, or used interchangeably with, the phrase 'reference signal'), transmitted by the aggressor RAN in a first transmit beam according to the cross link interference measurement parameter information; analyzing the cross link interference test signal with respect to the cross link interference measurement parameter information to result in analyzed cross link interference test signal information; generating, by the victim RAN, a cross link interference report based on a result of the analyzing of the cross link interference test signal information; and transmitting the cross link interference measurement report from the victim node to the aggressor node; wherein the request for the cross link interference measurement parameter information and the cross link interference report are transmitted via at least one backhaul interface.

The CLI measurement parameter information or the CLI measurement request or the CLI measurement acknowledgement may comprise at least one of: at least one measurement time resource, at least one measurement frequency resource, at least one priority level, at least one transmit and receive beam grouping indication, or at least one cross link interference test signal type.

The previous CLI measurement may further comprise muting, by the victim RAN, a resource corresponding to the cross-link interference measurement parameter information during a test period for which the aggressor node is configured to transmit the cross-link interference test signal according to the cross-link interference measurement parameter information.

The previous CLI measurement may further comprise receiving, from the aggressor RAN, a first preamble signal comprising a first preamble corresponding to the aggressor RAN; analyzing the first preamble signal with respect to configured location information corresponding to the aggressor RAN to result in analyzed preamble signal information; determining, based on the analyzed preamble signal information, a first offset time corresponding to a first transmit delay between the aggressor RAN and the victim RAN; and transmitting the first offset time to the first node, via the backhaul interface, for use by the aggressor RAN in transmitting the cross link interference test signal. A time stamp corresponding the transmitting of the test signal/reference signal may be used by the aggressor RAN to determine the first offset time. The determining of the offset time may be part of a pre-training procedure that is performed before a CLI measurement procedure. The victim RAN may provide the determined offset time to the aggressor RAN for use by the aggressor RAN in performing downlink transmission signals during a CLI measurement procedure.

The detecting, by the victim RAN, of the cross link interference test signal transmitted by the aggressor RAN in the first transmit beam may comprise detecting the cross link interference test signal in a first uplink beam and in a second uplink beam, wherein the cross link interference test signal is analyzed for the first uplink beam and for the second uplink beam, wherein the analyzed cross link interference test signal information comprises first analyzed cross link interference test signal information corresponding to analyzing the cross link interference test signal detected in the first uplink beam, and wherein the analyzed cross link interference test signal information comprises second analyzed cross link interference test signal information corresponding to analyzing the cross link interference test signal detected in the second uplink beam.

The previous CLI measurement may further comprise detecting the cross link interference test signal transmitted by the aggressor RAN in a second transmit beam according to the cross link interference measurement parameter information, wherein the detecting, by the victim RAN, of the cross link interference test signal transmitted by the aggressor RAN in the second transmit beam comprises detecting the cross link interference test signal in at least a third uplink beam, wherein the cross link interference test signal is analyzed for at least the third uplink beam, and wherein the analyzed cross link interference test signal information further comprises third analyzed cross link interference test signal information corresponding to analyzing the cross link interference test signal detected in at least the third uplink beam.

In the previous CLI measurement procedure, the detecting of the cross link interference test signal transmitted by the aggressor RAN in the first transmit beam and the analyzing the cross link interference test signal to result in the analyzed cross link interference test signal information are performed for at least one of: at least one measurement time resource, at least one measurement frequency resource, at least one priority level, at least one transmit and receive beam grouping indication, or at least one cross link interference test signal type.

In the previous CLI measurement procedure, the example method may further comprise determining, by the victim RAN node, a priority level based on a mapping of a full duplex sub-band pattern corresponding to the victim RAN.

A sub-space plan may include indication of at least one beam downlink beam that the second network equipment, or second RAN node, should not use for transmitting downlink traffic to a user equipment at a frequency and time that the first network equipment has scheduled the receiving at the first network equipment of uplink traffic, based on the location of the user equipment. For example, if the user equipment is located on a direct line between the first and second RAN nodes, the at least one beam that the second RAN should not use for transmitting downlink traffic at a frequency and time that the first RAN has scheduled for uplink traffic according to a full duplex sub-band pattern would likely comprise a downlink beam that emits significant downlink signal energy along the line between the first and second RANs. Thus, the compression subspace plan may comprise indication of at least one beam for a transmitting RAN to suppress (e.g., mute transmission) thus 'compressing' a geographic space that surrounds the user equipment and the first RAN such that significant downlink energy does not impinge on the compressed subspace and thus also likely impinge on an antenna at the first RAN. The second RAN may still deliver downlink traffic at the frequency and time that the first RAN is scheduled to receive uplink traffic using beams that may provide adequate downlink signal energy to the user equipment but that do not present significant cross-link interference energy at the first RAN that could cause disruption of scheduled receiving of uplink traffic packets at the first RAN at the same frequency and time.

In an embodiment, the network equipment of the RAN may comprise first network equipment of a first RAN, and example method may further comprise determining a traffic type of the first uplink traffic; and transmitting, via a second backhaul interface link, traffic type information corresponding to the traffic type of the first uplink traffic to second network equipment of a second RAN, to be used by the second network equipment in reference to a configured traffic-aware full duplex sub band mapping to determine, based on the traffic type of the first uplink traffic, whether to suppress transmission, by the second network equipment, of downlink traffic during an uplink sub band of the first full duplex sub band pattern to be used by the first network equipment to receive the first uplink traffic. Some uplink transmission may not be as latency-critical or reliability-critical as other uplink traffic. For uplink traffic associated with less stringent latency or reliability criteria as other traffic, a higher amount of CLI may be tolerated at the first RAN (e.g., even if CLI causes packets to be dropped retransmission and re-receiving of the dropped packets may not pose a delay that is critical to the overall transmission of the uplink traffic. Thus, by determining to indicate to the second RAN that suppression of downlink traffic in a downlink beam at a frequency and time that the first RAN is scheduled to receive the less critical upstream traffic, the first RAN helps maintain overall spectral efficiency of the second RAN by not asking that the second RAN negatively impact a downlink transmission just to accommodate a high quality uplink transmission of traffic to the first RAN that may not require the high quality. Thus, a mapping of actions of an aggressor RAN to a type of uplink traffic at a victim RAN may be used to dynamically and intelligently determine cooperation among RANs whether to suppress downlink transmission via a downlink beam, or downlink resource, based on a practical impact on upstream traffic at a RAN where the downlink traffic and uplink traffic are transmitted, and received, at the same frequency, or frequency range, resource and the same timing unit resource of one or more sub-band full duplex pattern(s) by an aggressor RAN and a victim RAN, respectively. Such cooperation may be applied with the compression subspace technique described above.

BRIEF DESCRIPTION OF THE DRAWINGS

FIG. 13 illustrates a chart of CLI coordination information objects that coordinating RANs may exchange over backhaul links.

FIG. 14 illustrates a chart of CLI coordination actions mapped to traffic types or channel types at a victim RAN.

DETAILED DESCRIPTION OF THE DRAWINGS

Figure 1:
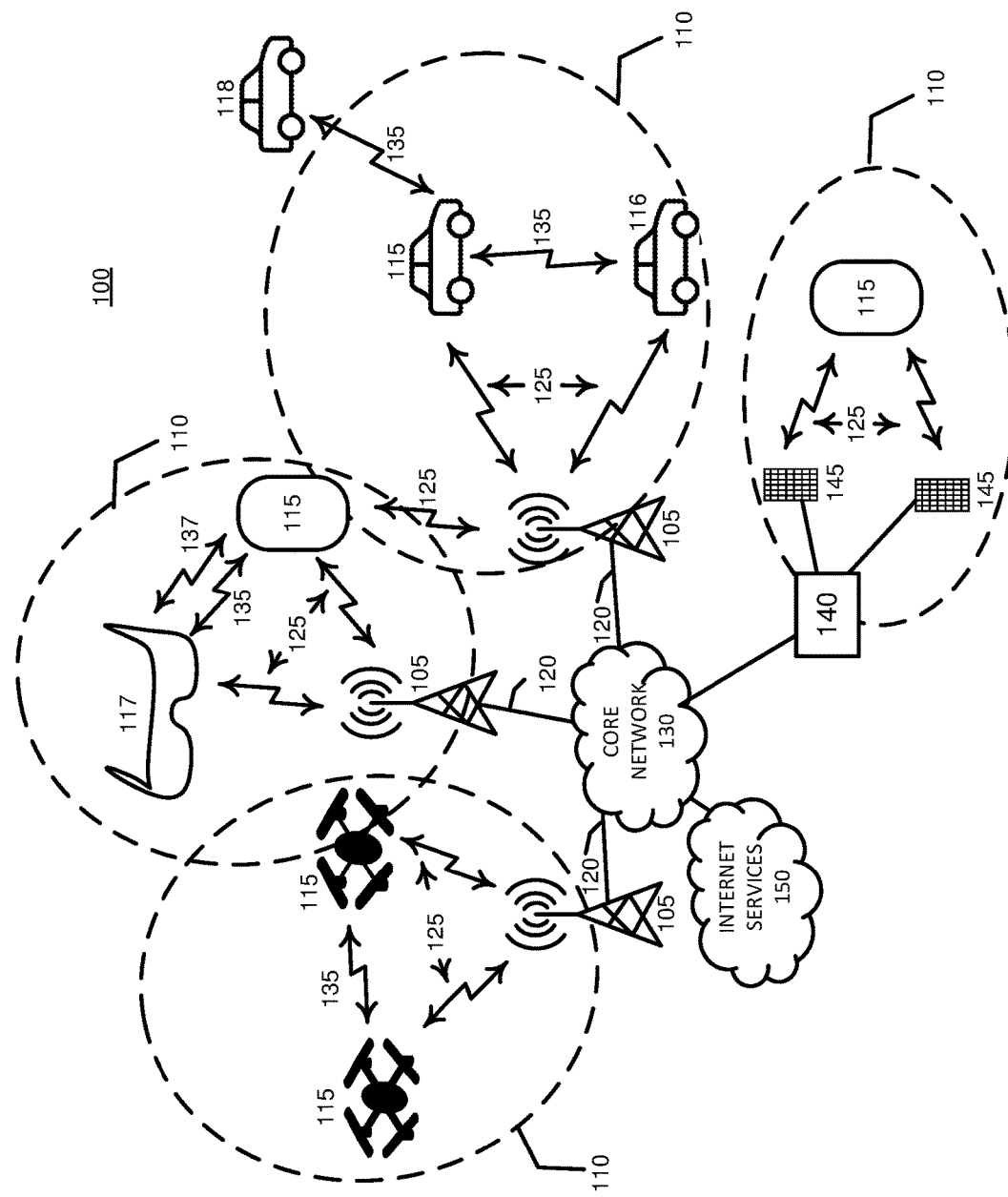
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. In yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Turning now to the figures, FIG. 1 illustrates an example of a wireless communication system 100 that supports blind decoding of PDCCH candidates or search spaces in accordance with one or more example embodiments of the present disclosure. The wireless communication system 100 may include one or more base stations 105, one or more user equipment ("UE") devices 115, and core network 130. In some examples, the wireless communication system 100 may comprise a long-range wireless communication network, that comprises, for example, a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 12.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office).

A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RB s)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications, such as sidelink communication, may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both. In FIG. 1, vehicle UE 116 is shown inside a RAN coverage area and vehicle UE 118 is shown outside the coverage area of the same RAN. Vehicle UE 115 wirelessly connected to the RAN may be a sidelink relay to in-RAN-coverage-range vehicle UE 116 or to out-of-RAN-coverage-range vehicle UE 118.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
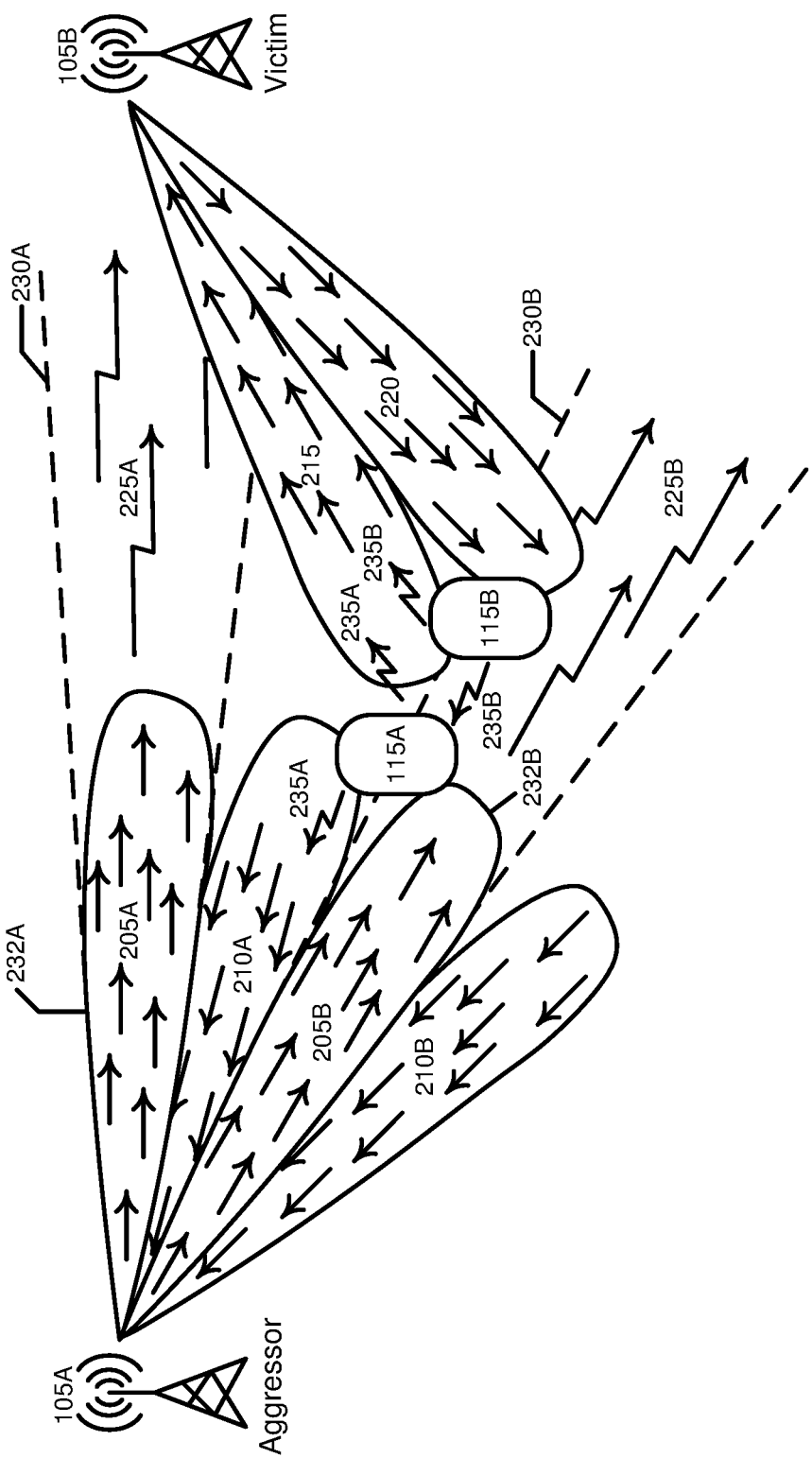
FIG. 2 illustrates an example multi-beam wireless user equipment environment.

Turning now to FIG. 2, the figure illustrates an example multi-beam wireless user equipment environment 200. Environment 200 shows RAN node 105A and RAN node 105B and UE 115A and UE 115B. UE 115A and UE 115B may be located at a signal coverage edge of either RAN 105A or RAN 105B. RAN 105A and RAN 105B may be geographically adjacent to one another insofar as a location of UE 115A and UE 115B may be at an edge of coverage of either RAN node. Thus, depending on various factors, such as a distance from UE 115A or UE 115B to either RAN 105A or RAN 105B, either UE may connect to either RAN. It will be appreciated that a UE may connect to one RAN for uplink traffic and to the other RAN for downlink traffic if the UE comprises multiple SIMs or multiple RF trains (e.g., multiple sets of separately tunable radio frequency circuitry).

RAN 105A may use multiple downlink beams, shown as downlink beam 205A and downlink beam 205B, to deliver downlink traffic to a user equipment and RAN 105A may use multiple uplink beams 210A and 210B, shown as uplink beam 210A and uplink beam 210B. It will be appreciated that a downlink beam may be associated with not only geographical, or spatial, dispersion of downlink signal energy from a RAN, but signal energy in a downlink beam may also be transmitted according to an associated frequency resource. For a given geographical/spatial dispersion pattern, a RAN may transmit multiple beams simultaneously if the RAN comprises multiple RF transmitter chains. Similarly, an uplink channel may be associated with a geographical/spatial sensitivity to uplink signal energy but may also be associated with a frequency at which an RF receiver circuit of the RAN is tuned to receive uplink traffic signal energy. Directional arrows inside of the beams shown in FIG. 2 correspond to traffic flowing in a downlink or uplink direction. Downlink beam 205A transmits signal energy 235A in a downlink direction; downlink signal energy is shown within beam cone 230A shown in broken lines to indicate that downlink signal energy may extend beyond a primary beam range of beam 205A indicated by beam lobe 232A, the outline of which is depicted as unbroken in the figure. Similarly, beam 205B transmits signal energy 235B in a downlink direction and downlink signal energy 235B may extend beyond beam lobe 232B. It will be appreciated that RAN 105A may facilitate more uplink and downlink beams than are shown in FIG. 2, but only two each of uplink and downlink beams corresponding to RAN 105A are shown for clarity in the figure. Furthermore, it will be appreciated that a downlink beam corresponding to RAN 105A may overlap partially, or completely, with an uplink beam, but the uplink and downlink beams corresponding to RAN 105A are shown in an alternating, or interleaved, fashion for clarity in FIG. 2.

Continuing with description of FIG. 2, assuming that UE 115A is connected to RAN 105A as indicated by UE 115A overlapping uplink beam lobe 210A and downlink beam lobe 205B, RAN 105A likely transmits downlink signal energy 225B to UE 115A via downlink beam 205B and RAN 105A likely receives uplink signal energy from UE 115A via uplink beam 210A. If UE 115A is not connected to RAN 105B, then even if UE 115A transmits uplink signal energy 235A that is receivable by RAN 105B via uplink beam 215 (e.g., the uplink signal energy is transmitted at a frequency and geographical, or spatial, sensitivity to which RAN 105B is tuned), RAN 105B may not monitor or decode the transmission from UE 115A because UE 115A is not connected to RAN 105B. RAN 105B may monitor or decode uplink signal energy 235B transmitted from UE 115B; uplink energy 235A transmitted by UE 115A typically will not pose a problem of interference or collision at RAN 105B even if UE 115A transmits during a period when RAN 105B is spatially sensitive to signals emanating within uplink beam 215 because UE 115A is not connected to RAN 105B and because the power of uplink energy 235A from UE 115A should be within a range that receiver circuitry at RAN 105B is designed to detect and decode, or to not decode.

However, if downlink energy 225A is transmitted in downlink beam 205A by RAN 105A during a period and at a frequency that RAN 105B is also using for detecting uplink signal energy according to uplink beam 215, uplink signal energy 235B may be overpowered and thus not detected, due to downlink energy from a RAN typically being more powerful than uplink signal energy transmitted from user equipment and also due to cone 230A spatially overlapping with spatial receiver sensitivity corresponding to uplink beam 215. Such overpowering of uplink detecting of one RAN by downlink signals of another RAN may be referred to a cross link interference. In FIG. 2, reference to RAN 105A as an 'Aggressor' RAN and reference to RAN 105B as a 'Victim' is not meant to assign a disparaging characterization to RAN 105A, but is merely meant to highlight that downlink signal energy transmitted from RAN 105A in beam 205A may cause interference during detecting of uplink signal energy in uplink spatial sensitivity corresponding to uplink beam 215 if the timing and frequency of the transmission of downlink energy 225A overlaps with a frequency and period that RAN 105B is simultaneously using to detect uplink traffic signal energy.

Example embodiments are described herein that may be used to control spatial spread of severe Base-Station-to-Base-Station ("BS-BS") CLI that facilitate linear receivers at a receiving, or victim, RAN in suppressing CLI by 'nulling' a subspace to which a significant amount of CLI corresponds. Novel backhaul coordination and new information element exchange procedures via backhaul interfaces, such as, for example, Xn and F1 interfaces, are described.

Full-Duplex Sub-Band Pattern Adaptation.

Adjacent RAN nodes may experience varying downlink and uplink traffic arrivals. Therefore, they may adopt different TDD radio frames and full duplex bands to adapt to these traffic varying conditions. It is important that adjacent cells be aware of radio frame information and full duplex sub-band information corresponding to other cells for purposes of CLI control and management. To facilitate CLI control and management, embodiments described herein may comprise a listing, a table, a database, or other form of storing information, of full duplex sub-band patterns where each pattern is associated with one or more full duplex sub-band sizes and locations, within a full duplexing frequency band, over TDD downlink and uplink time units, such as, for example, slots, minislots, frames, or subframes. Configurations of the full duplex sub-band patterns may be provided to RAN nodes from a core network, such as core network 130 shown in FIG. 1, over backhaul links. RAN nodes configured with full duplex sub-band patterns may dynamically select appropriate full duplex sub-band patterns based on time-variant downlink and uplink traffic arrivals of coordinating neighboring RAN nodes having full duplexing sub-band sizes, time duration, periodicity, and validity periods that are suitable for fulfilling respective RAN-specific-traffic latency and capacity targets. Coordinating RANs/cells may exchange full duplex sub-band pattern information over backhaul links. Those are the Xn interface for 3GPP distributed deployments and F1 interface for centralized deployments (e.g., Open RAN deployments). Full duplex sub-band pattern information may include index values corresponding to the selected full duplex sub-band pattern, associated validity period and periodicity in terms of ms, or number of upcoming slots, subframes, or TDD radio frames, respectively. Thus, after RANs have been configured with listings of sub-band patterns mapped to corresponding associated index values, one RAN may only transmit an index value to a coordinating RAN instead of sending a complete sub-band pattern set of information because a receiving RAN can look up the sub-band pattern information in its respective listing of sub-band patterns based on a received sub-band pattern index value. Thus, RANs/cells are configured with various CLI sub-band patterns and may dynamically exchange CLI sub-band pattern information, either full sub-band pattern information or an index, or other value, that is associated with a sub-pattern pattern, according to a procedure that minimizes signaling overhead.

In TDD, adjacent/neighboring RANs/cells may adopt different TDD radio frames and provide single-transmission exclusivity, (e.g., either a downlink or an uplink transmission at a time (which may induce buffering of traffic payload packets. For example, downlink packets arriving at a RAN during a previously configured uplink slot may be buffered towards the first available downlink transmission opportunity, thus potentially negatively impacting a radio latency budget (e.g., exceeding a latency requirement of the payload packets or not meeting a quality of Service requirement associated with the packets).

To reduce or eliminate an increase in latency, a full duplex sub-band, with a portion of the cell bandwidth being allocated for opposite-direction transmissions to the current configured TDD radio slot, may be used. For example, a full duplex bandwidth sub-band may be configured for downlink transmission during an uplink TDD slot, thus facilitating urgent new packets (e.g., having low-latency requirement) arriving at a RAN being transmitted during the non-aligned slots (e.g., non-aligned meaning an uplink transmission during a downlink time slot or a downlink transmission during an uplink time slot). However, even over inter-cell aligned radio slots or frames, CLI could be exhibited due to non-aligned full duplex sub-bands.

Thus, and with a reduced coordination signaling overhead, embodiments described herein may facilitate a set of configured full duplex sub-band patterns where a sub-band pattern corresponds to a set of downlink and/or uplink full duplex sub-bands with various spectral locations and sizes during a TDD radio timing unit. The timing unit can be configured as a TDD slot, a TDD minislot, a TDD radio frame, or a TDD subframe.

Figure 3:
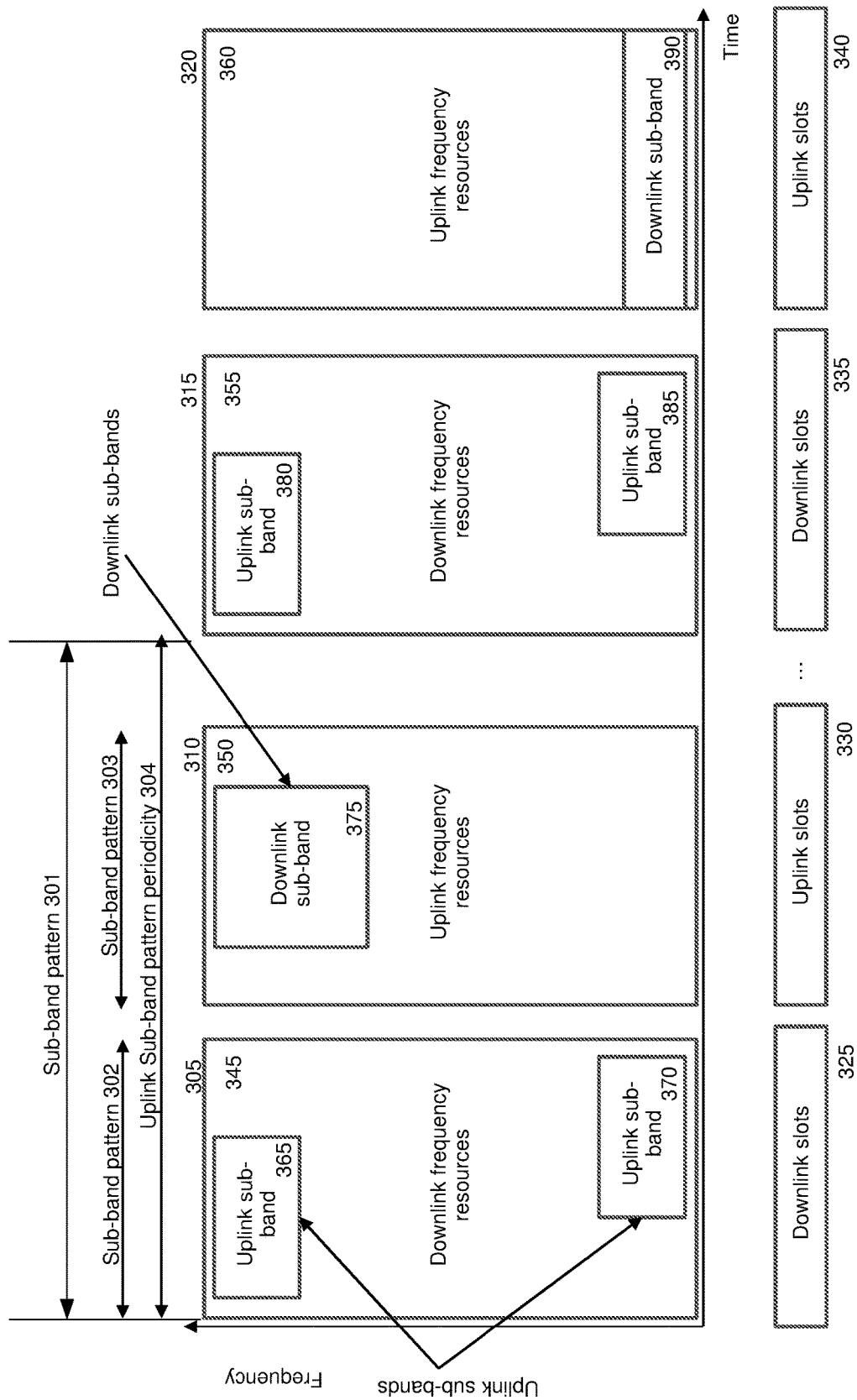
FIG. 3 illustrates an example embodiment of a full duplex sub-band pattern.

FIG. 3 illustrates an example embodiment of a full duplex sub-band pattern 301, which may be configured at multiple coordinating RANs that are adjacent to one another, comprising uplink sub-band pattern 305 corresponding to validity period 302 and downlink sub-band pattern 310 corresponding to validity period 303. The periodicity of sub-band pattern 301 is shown extending from the beginning of pattern 305 to the beginning of next pattern 315. It will be appreciated that in an embodiment time gaps shown as space between pattern 305 and pattern 310 may represent time when traffic packets can be transmitted or received according to a mode that may not necessarily comprise full duplexing. Sub-band pattern 301 may correspond to periodicity 304 which may be a configured value, a configured amount of time, or may correspond to passage of a configured number of timing units. Duration periodicity 304 may represent a period over after which duplex sub-band pattern 305 may be assumed available again and validity periods 302 and 303 may facilitate determination at RANs/cells adjacent to a RAN/cell that is applying sub-band pattern 301 of a time duration during which the current full duplex sub-band pattern 301 remains available/valid such that repetitive coordination signaling of a next sub band pattern may not be needed.

A shown in FIG. 3, uplink sub-band pattern 305 comprises downlink resources 345 corresponding to downlink time slots 325. Uplink sub-band resources 365 and 370 are shown as presenting uplink opportunities for a given RAN during downlink time slots 325 at frequencies configured to receive uplink transmission, with the frequencies corresponding to uplink sub-band resources 365 being higher than frequencies for uplink sub-band resources 370. Downlink sub-band pattern 310 is shown comprising downlink resources 350 corresponding to downlink time slots 330 with downlink sub-band resources 375 shown as presenting downlink opportunities during uplink time slots 330 at frequencies dedicated for transmission of downlink traffic.

A RAN may determine to change uplink or downlink sub-band patterns as traffic loading changes at the RAN. As shown in FIG. 3, uplink sub-band pattern 315 corresponding to downlink slots 335 and comprising downlink resources 355 and uplink sub-band resources 380 and 385, is similar to uplink sub-band pattern 305 and resources corresponding thereto. However, downlink sub-band pattern 320 corresponding to uplink time slots 340 differs from downlink sub-band pattern 310 insofar as downlink sub-band resources 390 are available for transmitting downlink traffic packets during time slots 340 during all of the slots and at different frequencies that downlink sub-band resources 375.

For purposes of example, uplink sub-band patterns 305 and 315 may be referred to as a first uplink sub-band pattern having a first sub-band pattern index associated therewith, while downlink sub-band pattern 310 may be referred to as a second downlink sub-band pattern and downlink sub-band pattern 320 may be referred to as a third downlink sub-band pattern, being associated with a second sub-band pattern index and a third sub-band pattern index, respectively. The first, second, and third sub-band patterns may be configured into neighboring RANs and when one RAN determines that a change from one pattern to another would be beneficial, the determining RAN may merely transmit an index value corresponding to the pattern instead of transmitting all information corresponding to a pattern. Thus, by transmitting only an index, bandwidth use may be economized among RANs cooperating with one another in one RAN notifying a neighboring RAN which of a given RAN's uplink time slots and frequencies may be used by the RAN to transmit downlink traffic and which downlink time slots of the given RAN may be used by the RAN to receive uplink traffic at the RAN.

In an embodiment, RANs may exchange information elements over backhaul links, such as: an index of selected full duplex sub-band pattern from a list of already-configured available patterns; an Index or value of pattern-specific periodicity; or an Index or value of pattern-specific validity period. Backhaul signaling may include use of an Xn interface to exchange LOAD INFORMATION or TDD SLOT INFO messages, and an F1 interface may be used to facilitate centralized deployments of sub-band pattern information.

Figure 4:
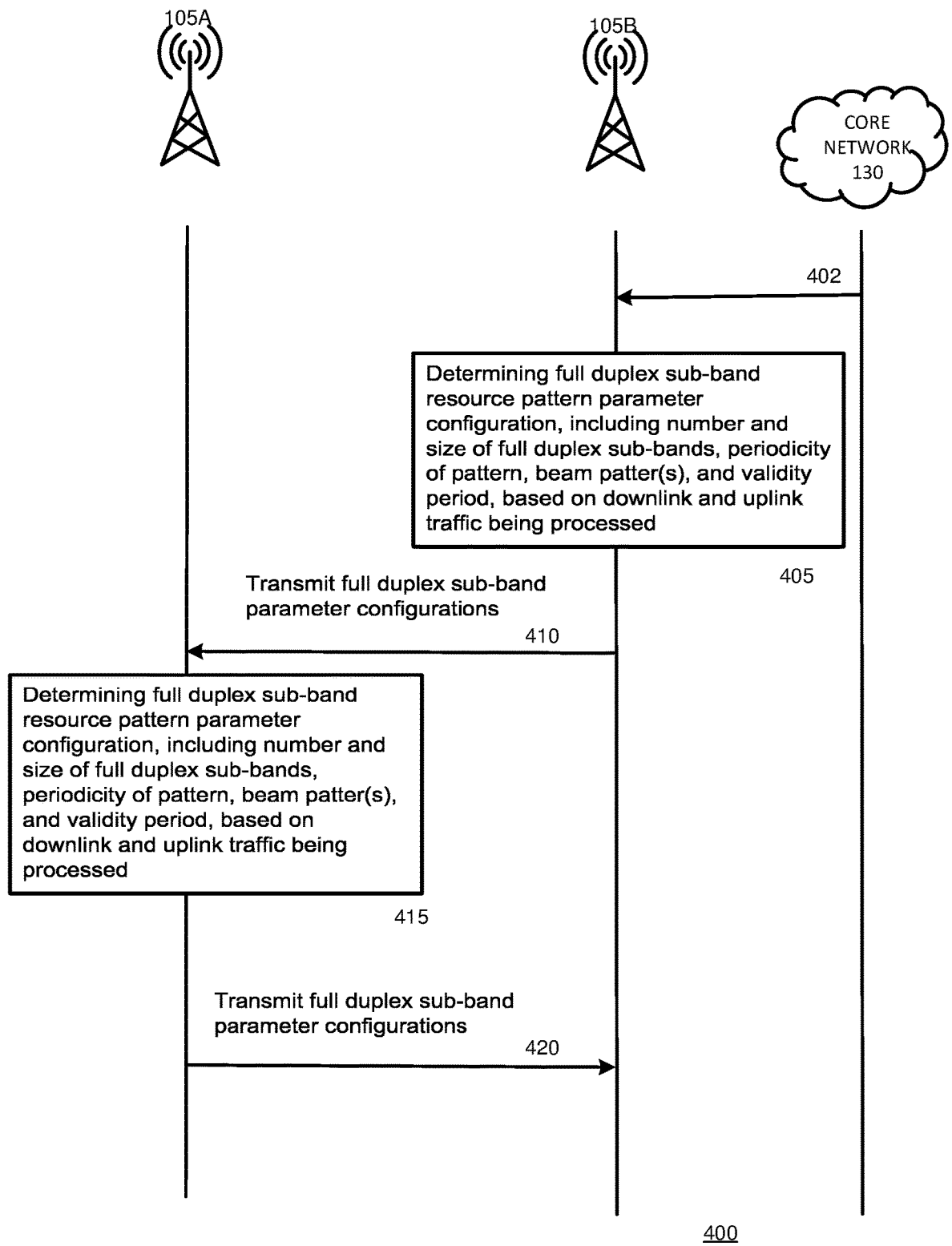
FIG. 4 illustrates a timing diagram of an example embodiment to synchronize a listing of sub-band full duplex coordination configurations.

Turning now to FIG. 4, the figure illustrates a timing diagram of an example embodiment 400 showing a RAN node 105A and another RAN node 105B synchronizing a listing of sub-band full duplex ("SBFD") coordination configurations. RAN node 105B receives TDD SBFD coordination configurations from core networks 130 at act 402 as of a list of allowed SBFD resource patterns, including radio frequency and timing resource information of each of the one or more downlink and/or uplink sub-bands belonging to the same pattern, a pattern periodicity, and pattern validity duration in terms of milliseconds, number of mini slots, number of slots, or number of frames. RAN 105B may determine at act 405 configurations of the configurations received at act 402 to transmit to neighboring, coordinating nodes. The determination at act 405 may be based on traffic load conditions, either present or forthcoming, at RAN 105B. RAN 105B may determine to transmit some configurations to certain nodes and different configurations to different nodes. At act 410 RAN 105B may transmit the configurations determined at step 405 to neighboring nodes, including neighboring node 105A. RAN node 105A may determine to send certain configurations to neighboring coordinating RAN nodes at step 415 and transmit the determined configurates to neighboring, coordinating nodes, including RAN node 105B, at act 420. The determination at act 415 may be based on traffic load conditions, either present or forthcoming, at RAN 105A. RAN node 105A and RAN node 105B may transmit the configurations, or configuration information, that may include index values that are uniquely associated with SBFD resource patterns, over the backhaul links (e.g., Xn/F1/S1 interfaces/links).

Cross-Link Interference Compression.

Figure 15:
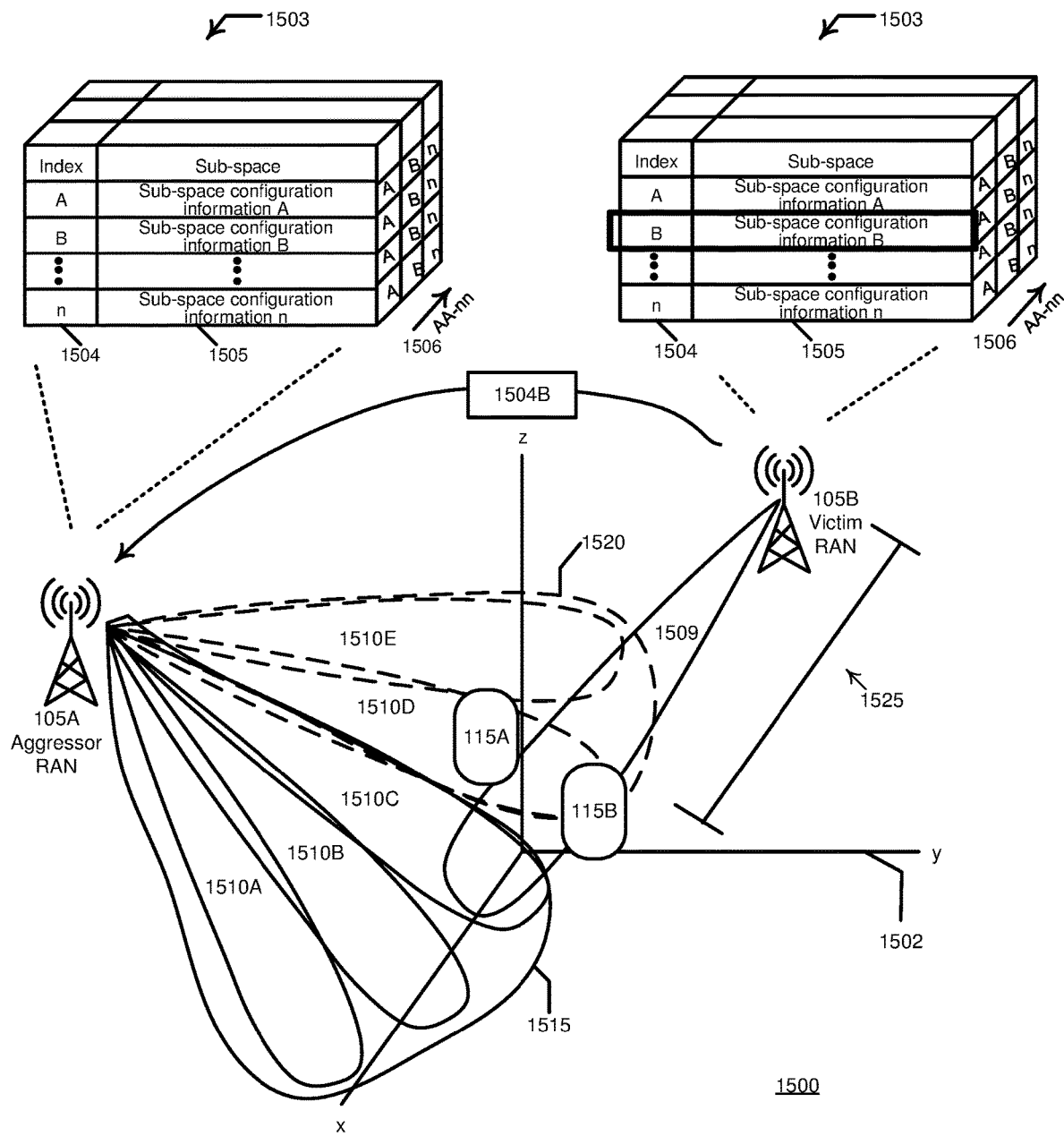
FIG. 15 illustrates an example embodiment three-dimensional space.

Severe CLI may be sparsely distributed in the spatial domain since it may be caused by different RAN nodes/cells over different spatial orientations and distances relative to a RAN node experiencing the CLI. Put another way, CLI may result at a given RAN during an uplink time slot at one or more frequencies that the given RAN is detecting (e.g., RF receiver sensitivity is tuned to the one or more frequencies) from neighboring RANs transmitting downlink traffic to various UEs spread through a three-dimensional geographic space. (It will be appreciated that although UEs may be distributed in a three-dimensional geographic space, figures described herein, other than FIG. 15, show two-dimensional space for clarity, which provides a good representation of spatial distribution due to most UEs typically used by users or that are statically located being typically located at a ground level geographical elevation relative to a victim RAN and an aggressor RAN.)

In attempting to combat sparse distribution of CLI, linear receivers at RANs typically suffer from existing techniques aimed at suppressing CLI and thus advanced and highly complex receivers are typically used to iteratively suppress CLI interference components in various spatial directions instead of using less costly and less complex linear receivers. Suppression schemes and receiver designs of the severe BS-BS CLI are complex. This complexity is attributed to the sparse spatial spread of the BS-BS CLI since it is generated from spatially distributed cells. Thus, linear receivers at a BS typically cannot suppress BS-BS CLI at one shot (e.g., suppression based on average interference statistics is not sufficient). Thus, more advanced, iterative, and highly complex receivers are typically used that algorithmically perform iterative matrices analysis.

However, even with the enhanced decoding ability that the more complex receiver designs may perform, iterative receivers consume more of a time/latency budget before decoding the received signal, which latency may not be tolerated for latency-critical traffic, due at least partly to the iterative processing. Thus, complex, iterative receivers tend to induce much larger delays before an upstream traffic signal is fully decoded than linear receivers do, thus making non-linear iterative receivers often unsuitable for latency-critical uplink traffic to a RAN experiencing CLI. Accordingly, embodiments described herein use novel techniques that facilitate adjacent RAN nodes/cells in coordinating and compressing spatial spread of severe cell-to-cell CLI such that linear receivers may be able to efficiently suppress the CLI with a one-shot attempt at decoding received upstream traffic.

To facilitate coordinating RANs in suppressing spatially disbursed CLI while using linear receivers, or using receivers configured to operate in a linear mode, or a non-iterative mode, RAN nodes may be configured with a list or a codebook of various CLI spatial subspaces and another list or codebook for spatial distances. 'Spatial subspace' may refer to a certain orientation in the spatial domain while 'spatial distance' may refer to a distance threshold in the spatial domain corresponding to a certain orientation or subspace. Accordingly, RANs/cells may determine a spatial subspace from spatial subspaces listed in a configured codebook of spatial subspaces that minimizes the experienced cross-cell CLI effective channel. A RAN may transmit, or share, via backhaul links, a determined desirable spatial subspace, an index of a determined CLI subspace from the CLU codebook or list, and a spatial distance allowed corresponding to full duplex sub-bands impacted by severe CLI.

A spatial distance threshold may include an indication of how much critical CLI can be tolerated. For example, a lower indicated distance threshold transmitted by a victim RAN may indicate that the victim RAN/cell can tolerate, to some extent, severe CLI over the corresponding full duplex sub-band, and thus offer more scheduling flexibility, or freedom, to an adjacent aggressor RAN node. An aggressor RAN node, receiving the CLI spatial information from a potential victim RAN, may restrict scheduling allocation over indicated full duplex CLI sub-bands (e.g., uplink sub-bands that are susceptible to CLI from one or more downlink transmission beams) only to UE devices fulfilling a distance threshold corresponding to an indicated CLI subspace indicated in shared information received from the potential victim RAN. For example, an aggressor RAN may only schedule downlink transmission to an active UE device, or devices, via a given full duplex sub-band, if the location of the UE device(s) satisfies spatial characteristics corresponding to a maximum allowed spatial distance or an CLI spatial subspace indicated by information received from a potential victim RAN. Thus, severe BS-BS CLI can be 'compressed' in the spatial domain via selective non-scheduling of downlink traffic in certain downlink beams by an aggressor RAN, and thus receivers needing less complexity and processing may be effectively used at RAN nodes instead of more complex iterative receivers.

To efficiently suppress severe CLI, the CLI spatial spread may be compressed, in the spatial domain, such that a one-shot average interference suppression may be sufficient. In an example embodiment, an inter-cell coordination procedure facilitates RANs/cells cooperating in compressing spatial spread of the CLI for an active full duplex sub-band. An uplink victim RAN/cell may determine a cell-to-cell effective CLI channel, using CLI channel measurements, corresponding to one or more full duplex sub-bands. The victim RAN may determine a spatial subspace and/or a spatial subspace index from a list or a codebook of pre-configured CLI subspaces. A coordinating aggressor RAN may use information corresponding to the spatial subspace to minimize the CLI effective channel power that causes CLI at the victim RAN by restricting scheduling of downlink traffic at a downlink sub-band frequency (or at a frequency that would cause CLI at the victim RAN) during uplink time slots corresponding to the victim RAN via downlink beams that are spatially primary contributors to CLI at the victim RAN when the victim RAN is receiving uplink traffic at the same frequency as the downlink sub-band frequency. The determination by the victim RAN of the subspace may be based on analysis of previously performed CLI measurements that correspond to the spatial subspace determination. The victim RAN may determine a spatial distance and/or spatial distance threshold index from a list or a codebook of pre-configured CLI spatial distance, associated with one or more CLI full duplex sub-bands. As depicted in FIG. 13, coordinating RANs may exchange, over backhaul links, CLI coordination information objects including the CLI spatial subspace and distance information with adjacent aggressor cells for one or more CLI full duplex sub-bands within a currently active full duplex validity period.

Based on received CLI coordination spatial subspace and distance threshold information, an aggressor RAN/cell may restrict user equipment scheduling over the indicated full duplex downlink sub-bands to user equipment that satisfies the spatial distance threshold and the CLI subspace. Accordingly, spatial spread of likely BS-BS CLI is compressed such that downlink signal energy from the would-be aggressor RAN does not significantly encroach into the indicated CLI subspace or within an area (or volume space) corresponding to an indicated spatial distance threshold shared from the victim RAN to the would-be aggressor RAN. If there are no active user equipment devices in an indicated subspace or within a space corresponding to an indicated spatial distance threshold an aggressor cell may completely mute full duplex sub-band corresponding to a CLI channel as determined by the victim RAN, and thus introduce no CLI to the victim RAN/cell. (It will be appreciated that even when an aggressor RAN compresses scheduled downlink transmission to UEs that are outside of a subspace or beyond a sub-band spatial threshold as determined by a victim RAN, there will likely still exist an amount of CLI at the victim RAN, albeit much less than if the spatial compression technique described herein were not used.)

FIG. 15 illustrates an example embodiment three-dimensional space 1500 showing victim RAN 105B and aggressor RAN 105A relative to a three-axis reference system 1502. In the example, RAN 105B may be scheduled to receive uplink traffic from UE 115B according to uplink resources (time slots and a frequency or spectrum portion) via uplink beam 1509. Aggressor RAN 105A may have received downlink traffic that needs to be delivered to UE 115A. RAN 105A may have available for use a sub-band pattern that specifies a downlink sub-band frequency range during uplink time slots corresponding to RAN 105A. Downlink beams 1510A-1510E may be available for use by RAN 105A.

However, based on previously conducted CLI measurements, victim RAN 105B may have determined that downlink transmission in downlink beams 1510D and 1510E may cause CLI interference that unacceptably overpowers (e.g., more CLI than a determined CLI threshold) uplink transmission from user equipment located where UE 115B is located. As described herein, RAN 105B and RAN 105B may have been previously configured with codebook 1503, or other type of storage structure, that associates CLI subspace suppression configuration information 1505 corresponding to compression sub-spaces with compression sub-space indices 1504. Codebook 1503 may also associate compression sub-space configuration information 1505 and sub-space information indices 1504 with sub-band spatial threshold distances 1506 (as indicated by the A-n blocks in the depth direction for each row in the three-dimensional codebooks 1503 shown in FIG. 15). It will be appreciated that although sub-band spatial distance threshold values may be included in a codebook separate from codebook 1503, the sub-band spatial thresholds are indicated in FIG. 15 as part of codebook 1503 for purpose of illustration.

Based on an analysis of a spatial location of UE 115B with respect to information contained in codebook 1503, RAN 105B may determine that RAN 105A applying subspace information 1505B (shown in FIG. 15 outlined in bold) would facilitate RAN 105A delivering downlink transmissions to user equipment including UE 115A, during frequency and time resources that RAN 105B needs to receive uplink transmission from UE 115B without exceeding a determined CLI threshold. Accordingly, RAN 105B transmits to RAN 105A, via one or more backhaul links/interfaces, an index, or indication, 1504B, associated with sub-space configuration information 1505B, to use in suppressing downlink transmission via downlink beam 1510D and downlink beam 1510E at frequency and timing resources that RAN 105B is scheduled to use for receiving uplink transmission from UE 115B.

RAN 105A receives the compression sub-space index/indication 1504B, looks up compression sub-space information corresponding to index value 1504B in codebook 1503, which may also be stored at RAN 105A, and accordingly suppresses, mutes, or does not transmit, downlink traffic transmission in downlink beam 1510D and downlink beam 1510E, which are both illustrated in FIG. 15 with broken lines. UE 115A may still receive downlink traffic transmission in one or more of downlink beams 1510A-1510C, likely downlink beam 1510C since UE 115A is likely close enough to the primary beam pattern of downlink beam 1510C to detect a downlink signal transmitted therein. Thus, by following configured information corresponding to index value 1504B retrieved locally from codebook 1503, RAN 105A essentially 'compresses' spatial downlink signal energy by creating compressed subspace 1520, corresponding to subspace information 1505B and associated subspace index 1504B, shown in broken lines surrounding muted downlink beams 1510D and 1510E, while still performing downlink transmission in uncompressed subspace 1515 that is shown surrounding unmuted beams 1510A-1510C. It will be appreciated that RAN 105B may have selected compression sub-space information 1505B based not only on the spatial location of UE 115B relative to downlink beams 1510A-1510E and corresponding, previously measured, CLI resulting from reference signals transmitted from RAN 105A during a previously-performed CLI measurement procedure, but also based on UE 115B being located a spatial distance 1525 from RAN 105B. If UE 115B had been closer to RAN 105B than shown in FIG. 15 then uplink signal energy from UE 115B may have been stronger than if located at the spatial distance 1525 shown in FIG. 15. In such a scenario, RAN 105B may have been able to tolerate CLI from downlink beam 1510D since uplink signal power from UE 115B would be stronger at RAN 105B than if located spatial distance 1525 and therefore RAN 105B may have selected different compression sub-space information than 1505B. Such different selected subspace information may have only required muting by RAN 105A of transmitting downlink traffic according to resources to be used by RAN 105B for receiving up uplink transmissions from UE 115B via downlink beam 1510E instead of muting such transmission for both beams 1510D and 1510E, thus resulting in a compressed subspace only surrounding downlink beam 1510E instead of both beam 1510E and beam 1510D as shown by compression subspace 1520 shown in FIG. 15.

Figure 5:
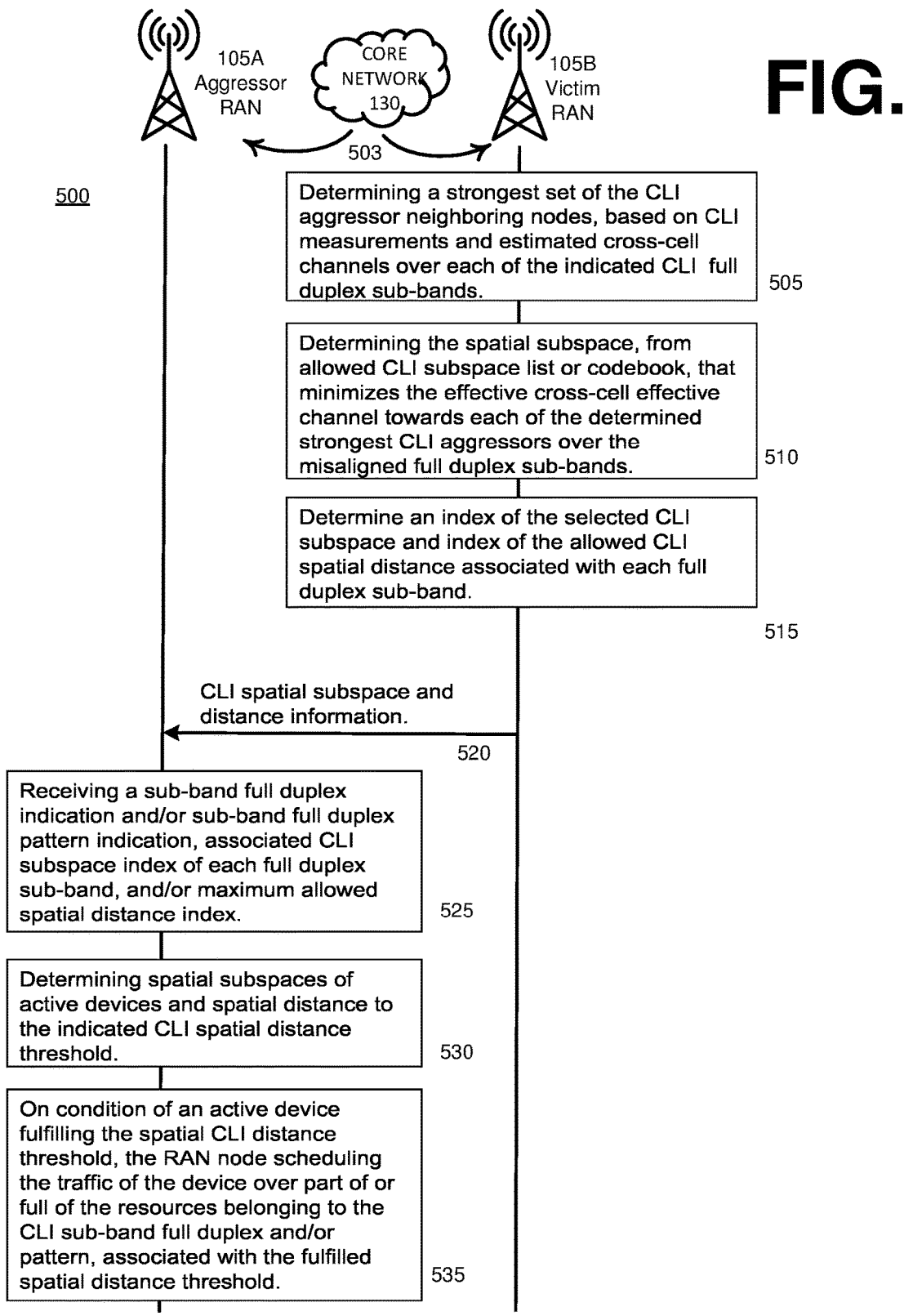
FIG. 5 illustrates a timing diagram of an example embodiment to implement a compression sub-band spatial subspace.

Turning now to FIG. 5, RAN nodes 105A and 105B receive at act 503 CLI suppression coordination configurations from core networks or from neighboring RAN nodes, including a list or a codebook of configured spatial CLI compression subspace information corresponding to certain spatial directions or orientations in the spatial domain and a list of allowed minimum spatial distances, or spatial distance threshold values. A CLI suppression information configuration used for coordinating, between RAN nodes, suppressing of downlink transmission beams may be referred to as a compression sub-space plan; a compression sub-space plan may comprise configured spatial CLI subspace information 1505 or configured spatial threshold distance information 1506 as described in reference to FIG. 15. Continuing with description of FIG. 5, victim RAN node 105B may determine at act 505 a strongest set of CLI aggressor neighboring nodes, based on prior CLI measurements and estimated cross-cell CLI channels for each of a plurality of CLI sub-band full duplex resource sets. At act 510 RAN node 105B may determine a spatial subspace plan, from CLI subspace plans configured in a list or codebook, that minimizes cross-cell, or cross-link, interference channel effects from the determined strongest CLI aggressor RANs corresponding to misaligned sub-band full duplex sub-bands (e.g., misaligned referring to an aggressor RAN attempting to transmit downlink traffic at a frequency and time that a victim RAN is scheduled to receive uplink traffic).

At act 515 victim RAN node 105B may determine an index value, or index values, corresponding to the selected CLI subspace plan or an index value corresponding to a CLI spatial minimum distance associated with each full duplex sub-band and subspace plan, and at act 520 may transmit the determined index value, or values, over the backhaul links (Xn/F1/S1 interfaces) towards coordinating RAN nodes, such as aggressor RAN node 105A.

At act 525 aggressor RAN node 105A may receive from neighboring RAN node 105B, over backhaul interfaces, sub-band full duplex indication information or sub-band full duplex pattern indication information that was transmitted at act 520. The sub-band full duplex indication information or sub-band full duplex pattern indication information may comprise a CLI subspace index of a full duplex sub-band subspace or a maximum allowed spatial distance/threshold index. Aggressor RAN node 105A may determine at act 530 spatial subspaces of active UE devices and spatial distances corresponding thereto relative to the indicated CLI spatial distance threshold. At act 535, RAN 105A may schedule downlink traffic according to the sub-band full duplex indication information or sub-band full duplex pattern indication information received at act 525 to an active UE device that is farther away from RAN 105B that the CLI spatial distance threshold indicated in information received at act 525. RAN 105A may schedule or transmit at act 530 downlink traffic to the UE device via part of, or all of, resources corresponding to the CLI sub-band full duplex and/or pattern and associated with the spatial distance threshold, which the location of the UE has been determined to satisfy.

Traffic-Aware Full-Duplex Sub-Band CLI Coordination.

CLI inter-cell coordination schemes typically restrict the scheduling flexibility of the aggressor cells to control certain spatial or resource characteristics of the CLI interference. Furthermore, due to the distributed nature of the CLI coordination schemes across multiple adjacent cells with various traffic conditions, certain coordination actions may not be feasible to be performed at a certain aggressor RAN/cell, thus degrading CLI coordination or RAN performance that might otherwise result from coordination. In addition to a victim RAN that may need to detect critical uplink traffic, an aggressor RAN/cell may also be carrying latency-critical or reliability-critical traffic that needs to be transmitted to a UE. For example, an aggressor RAN/cell may be asked by a victim RAN to mute some resources or restrict user equipment scheduling over some available resource to control CLI at the victim RAN. Such coordination to suppress CLI may result in reduced performance of an aggressor RAN in transmitting downlink traffic according to a downlink sub-band resource.

Accordingly, an example embodiment facilitates traffic-aware CLI coordination that is based on the fact that not all victim uplink channel traffic is equally important, not all CLI interference of victim uplink channel traffic equally negatively impacts overall latency performance, and not all victim uplink channel traffic is equally sensitive to CLI interference. For example, uplink control channel is vital for carrying device feedback information, and thus should be prioritized for being received rapidly and reliably unless the uplink data channel is blocked for some reason. However, receiving of uplink sounding reference signal transmissions are not as important as receiving uplink control channel information, because CLI interfering with reference signals does not typically negatively impact data latency performance. Thus, a CLI coordination action map, such as map 1400 show in in FIG. 14, may be shared among coordinating RANs/cells over backhaul links.

CLI action map 1400 may associate different coordination actions 1410 of aggressor cells with different sub-band-specific victim channel types 1405 (e.g., full duplex sub-bands that are carrying different victim uplink channels at the victim RANs/cells). For example, aggressor RANs/cells may completely mute (e.g., action 1411) a full duplex sub-band which contributes severe CLI to critical uplink control channels (e.g., severely affected channel 1406). However, an aggressor RAN may only perform spatial separation of downlink traffic scheduling to user equipment for a full duplex sub-band (e.g., action 1413) downlink transmission that contributes severe CLI only to non-critical uplink reference signal transmissions (e.g., affected channel 1408).

Some embodiments disclosed herein provide traffic-aware CLI coordination, where coordination actions 1405 of the aggressor RANs/cells are determined based on a type and criticality 1410 of the uplink traffic on victim resources. Thus, aggressor RANS/cells, upon determination of inter-RAN/cell CLI coordination conflict, may prioritize the performing of coordination actions that prevent severe impact of more critical uplink victim traffic, while allowing some negative impact on less critical traffic, thus facilitating delivery of downlink traffic to user equipment connected to the aggressor RAN in downlink sub-band resource without causing significant CLI impact at the victim RAN. Accordingly, aggressor RANS/cells may have flexibility in scheduling downlink traffic in sub-band downlink resources depending on a type of traffic that such downlink transmission may impact with CLI.

Figure 6:
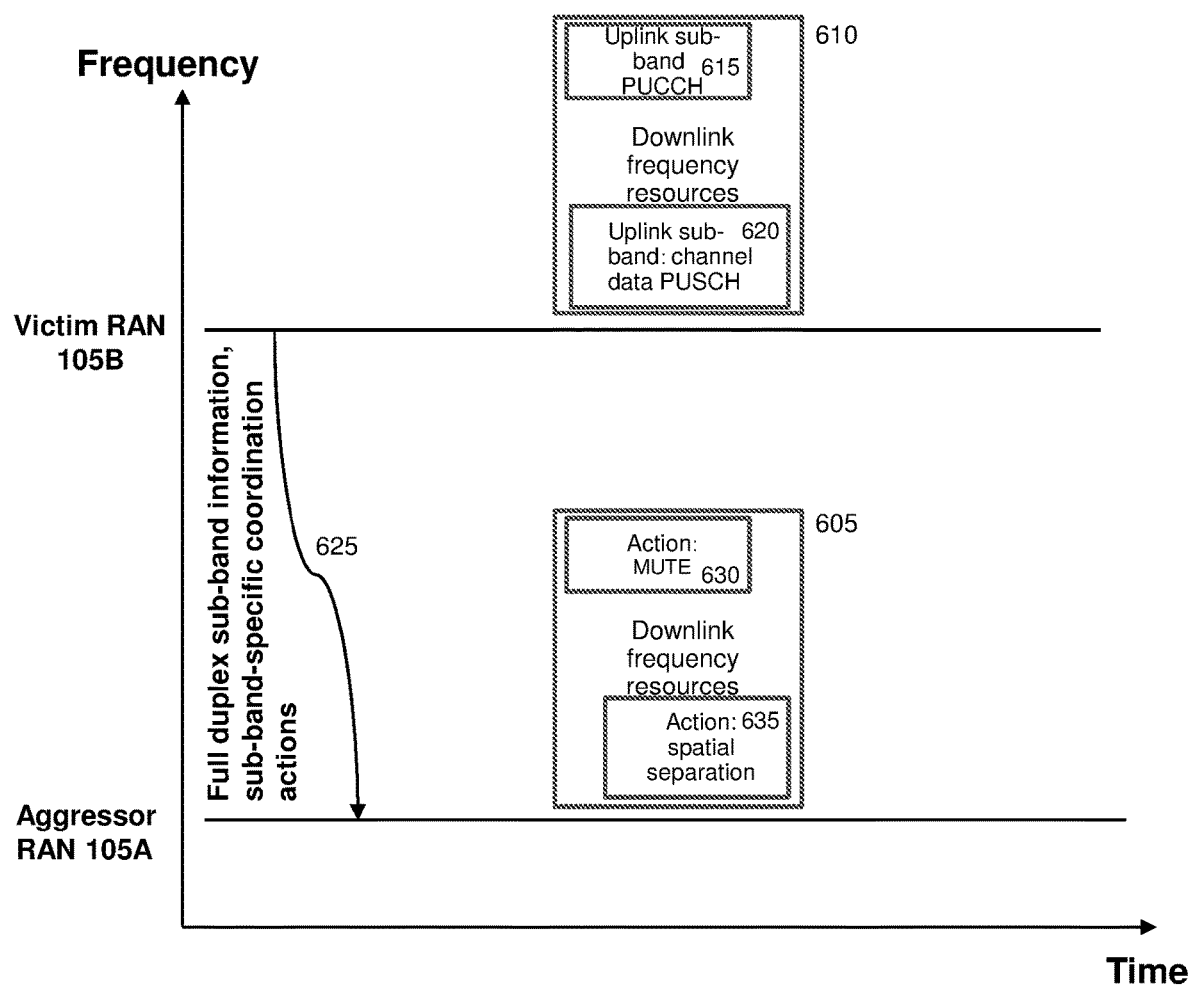
FIG. 6 illustrates an example embodiment to implement a CLI coordination action based on traffic type or channel type of a victim RAN.

As illustrated in FIG. 6, a CLI coordination action, associated with of the full duplex sub-bands, may be determined based on a traffic or channel type of the victim cell. Accordingly, several CLI coordination actions can be defined and dynamically performed by aggressor cells. For example, as shown by the exemplary stage-3 content of the proposed CLI coordination signaling in FIG. 14, a list of the CLI coordination actions 1410 of the aggressor cell mapped the type 1405 of victim uplink channel or traffic may be exchanged among core network and coordinating RANs/cells. For critical uplink victim channels, (e.g., uplink control channels 1406 or 1407) CLI can potentially block, or overpower, reception of the uplink control information, and accordingly, directly cause negative impact on latency at victim uplink RAN/cell (if a RAN cannot receive control channel information corresponding to payload traffic packets either uplink or downlink, the RAN cannot receive, or transmit, the packets). Thus, aggressor RANs/cells may be instructed to completely mute their interfering downlink transmissions over the respective full duplex sub-bands (e.g., action 1411). However, for less critical victim channels, such as, for example, uplink resources carrying sounding reference signals or for channels carrying traffic with a lenient latency requirement or for channels having a lower reliability requirement (e.g., more lenient latency or reliability requirements vis-à-vis control channel traffic packets), more CLI may be tolerated at a victim RAN. Accordingly, aggressor cells may not need to mute their resources to prevent all significant CLI, thus maximizing overall spectral efficiency among coordinating RANs in delivering, receiving, or processing traffic, because compression of certain downlink bands may not be necessary for the lower criticality traffic to be received and detected in an uplink sub-band according to timing and frequency resources via a downlink beam that may cause CLI at a RAN receiving the less-critical-requirement traffic.

Thus, as depicted by FIG. 6, CLI coordination action associated with full duplex sub-bands may be determined based on a traffic type or a channel type at the victim RAN/cell 105B. Several CLI coordination actions can be defined and dynamically performed by aggressor cells. For instance, as shown by the exemplary stage-3 content of CLI coordination mapping 1400 shown in FIG. 14, a mapping list 1400 of CLI coordination actions 1405 of an aggressor cell versus the type 1410 of victim uplink channel or traffic is exchanged among core network components and coordinating RANs/cells. As shown in FIG. 6, for more critical uplink victim channel reception in uplink sub-band 615, (e.g., for uplink control channels), CLI could potentially block, overpower, or drown-out, reception of the uplink control information, and accordingly, directly impact the end latency of the victim uplink RAN 105B. Thus, aggressor RAN 105A may be required, or requested, by victim RAN 105B at act 625 to completely mute interfering downlink transmissions during downlink sub-band 630 of aggressor RAN's 105A downlink resources 605 during full duplex uplink sub-band 615 of downlink resources 610 of victim RAN 105B. However, for less critical victim channels, such as, for example, uplink sub-band resources 620 carrying sounding reference signals or less latency-critical or less reliability-critical data channels such as PUSCH data, more CLI can be tolerated, and accordingly, aggressor RAN 105A may not need to mute resources 635, but instead may perform spatial separation (e.g., action 1412 in FIG. 14) or merely transport payload (e.g., action 1413 in FIG. 14 for uplink sounding reference signal reception at victim RAN 105B), thus increasing overall spectral efficiency.

Figure 7:
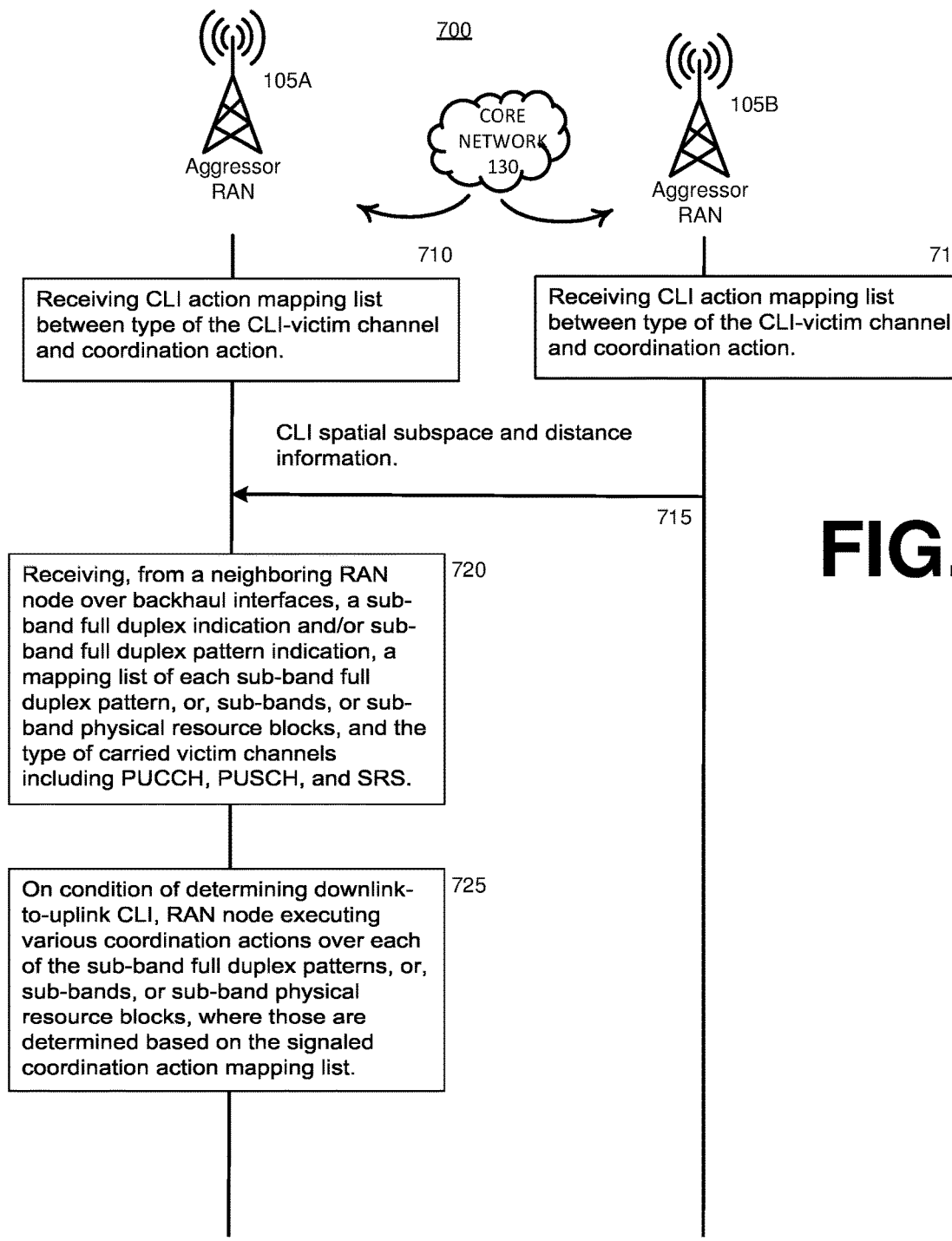
FIG. 7 illustrates a timing diagram of an example method to determine action at an aggressor RAN based on traffic types or channel types at a victim RAN.

Turning now to FIG. 7, the figure illustrates a timing diagram of an example method embodiment to facilitate traffic aware coordination of full duplex resources. Coordinating RAN nodes 105A and 105B receive at act 710 CLI action mapping list, such as mapping 1400 shown in FIG. 14, from core network 130, or from one or the other RAN. Mapping 1400 may provide a mapping between a type of CLI-victim channel and a coordination action to be performed at an aggressor RAN. At act 715 victim RAN 105B may transport to aggressor RAN 105A spatial subspace and distance threshold information as described elsewhere herein. At act 720 aggressor RAN 105A may receive from neighboring victim RAN node 105B over backhaul interfaces, a sub-band full duplex indication or a sub-band full duplex pattern indication, a mapping list of each sub-band full duplex pattern, or, sub-bands, or sub-band physical resource blocks, and a type of carried victim channels such as, for example, PUCCH, PUSCH, or SRS. On condition of aggressor RAN 105A determining downlink-to-uplink CLI based on current traffic load and the information received at acts 710 and 720, the aggressor RAN node may execute coordination actions at act 725 for sub-band full duplex patterns, or, sub-bands, or sub-band physical resource blocks, where the coordination actions are determined at the aggressor RAN node 105A based on the coordination action CLI mapping list 1400.

Figure 8:
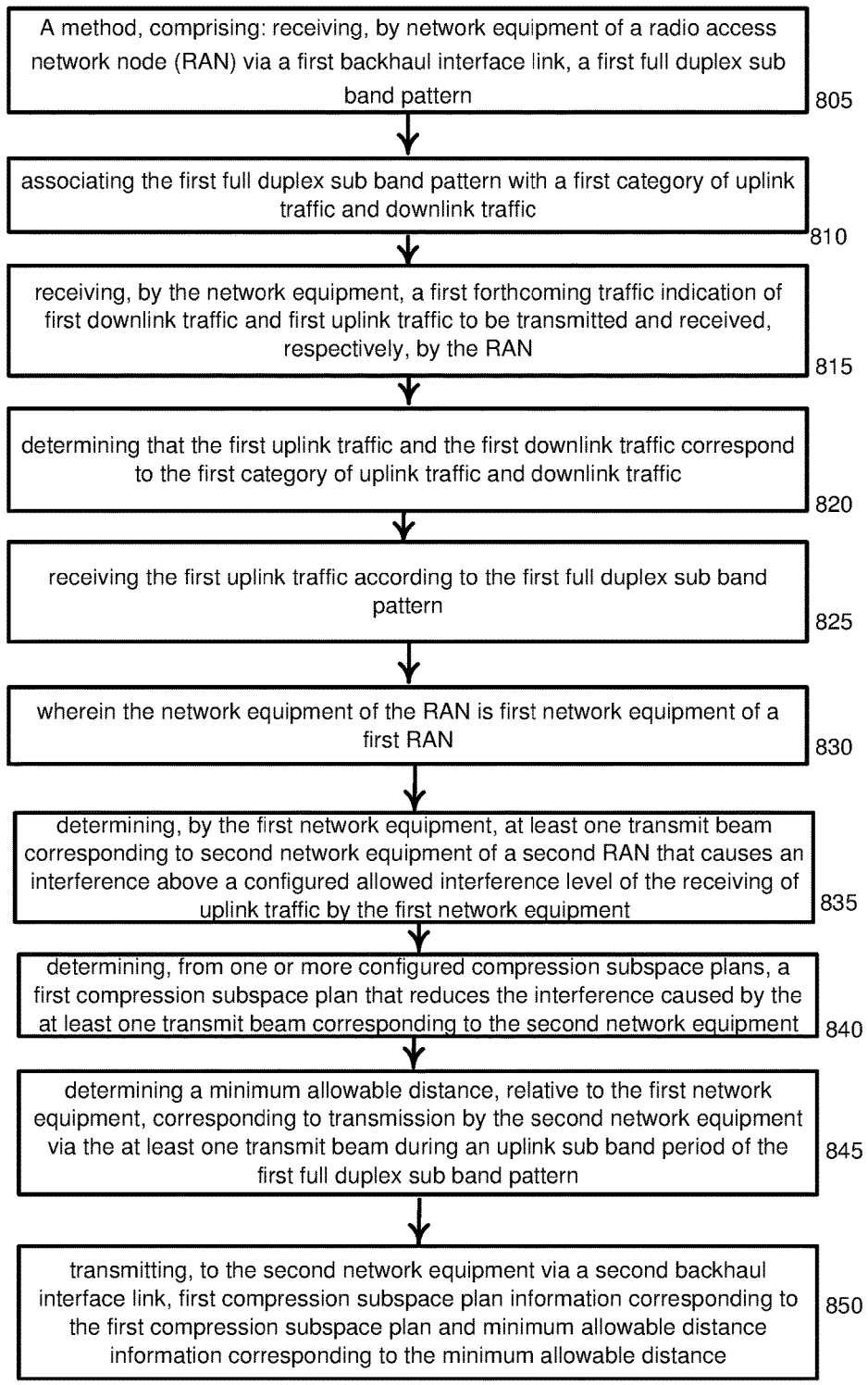
FIG. 8 illustrates a block diagram of an example method.

Turning now to FIG. 8, the figure illustrates an example embodiment method 800 comprising at block 805 receiving, by network equipment of a radio access network node (RAN) via a first backhaul interface link, a first full duplex sub band pattern; at block 810 associating the first full duplex sub band pattern with a first category of uplink traffic and downlink traffic; at block 815 receiving, by the network equipment, a first forthcoming traffic indication of first downlink traffic and first uplink traffic to be transmitted and received, respectively, by the RAN; at block 820 determining that the first uplink traffic and the first downlink traffic corresponds to the first category of uplink traffic and downlink traffic; at block 825 receiving the first uplink traffic according to the first full duplex sub band pattern; at block 830 wherein the network equipment of the RAN is first network equipment of a first RAN; at block 835 determining, by the first network equipment, at least one transmit beam corresponding to second network equipment of a second RAN that causes an interference above a configured allowed interference level of the receiving of uplink traffic by the first network equipment; at block 840 determining, from one or more configured compression subspace plans, a first compression subspace plan that reduces the interference caused by the at least one transmit beam corresponding to the second network equipment; at block 845 determining a minimum allowable distance, relative to the first network equipment, corresponding to transmission by the second network equipment via the at least one transmit beam during an uplink sub band period of the first full duplex sub band pattern; and at block 850 transmitting, to the second network equipment via a second backhaul interface link, first compression subspace plan information corresponding to the first compression subspace plan and minimum allowable distance information corresponding to the minimum allowable distance.

Figure 9:
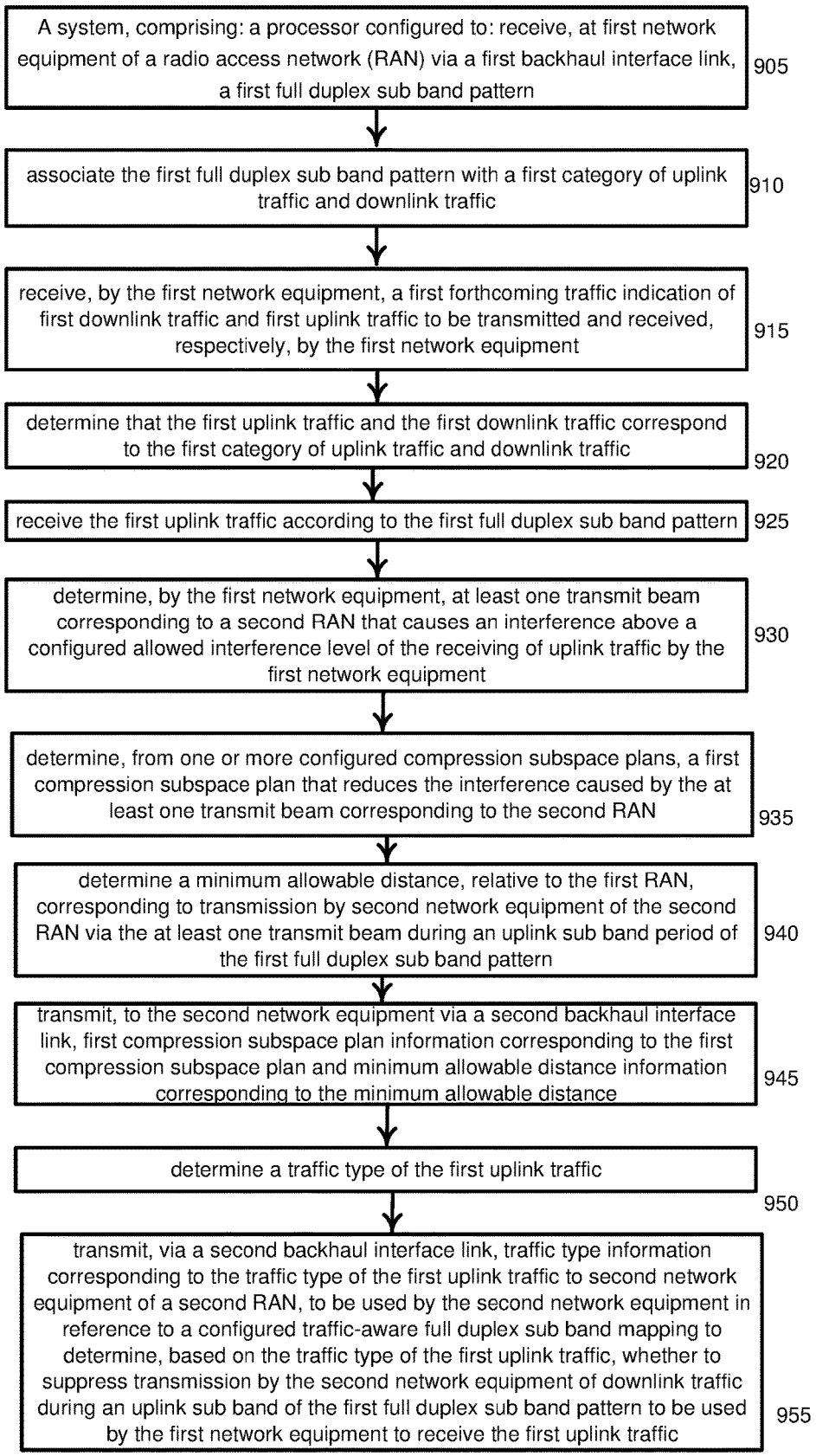
FIG. 9 illustrates a block diagram of an example system.

Turning now to FIG. 9, the figure illustrates an example system embodiment 900 comprising at step 905 a processor configured to: receive, at first network equipment of a radio access network (RAN) via a first backhaul interface link, a first full duplex sub band pattern; at block 910 associate the first full duplex sub band pattern with a first category of uplink traffic and downlink traffic; at block 915 receive, by the first network equipment, a first forthcoming traffic indication of first downlink traffic and first uplink traffic to be transmitted and received, respectively, by the first network equipment; at block 920 determine that the first uplink traffic and the first downlink traffic corresponds to the first category of uplink traffic and downlink traffic; at block 925 receive the first uplink traffic according to the first full duplex sub band pattern; at block 930 determine, by the first network equipment, at least one transmit beam corresponding to a second RAN that causes an interference above a configured allowed interference level of the receiving of uplink traffic by the first network equipment; at block 935 determine, from one or more configured compression subspace plans, a first compression subspace plan that reduces the interference caused by the at least one transmit beam corresponding to the second RAN; at block 940 determine a minimum allowable distance, relative to the first RAN, corresponding to transmission by second network equipment of the second RAN via the at least one transmit beam during an uplink sub band period of the first full duplex sub band pattern; at block 945 transmit, to the second network equipment via a second backhaul interface link, first compression subspace plan information corresponding to the first compression subspace plan and minimum allowable distance information corresponding to the minimum allowable distance; at block 950 determine a traffic type of the first uplink traffic; and at block 955 transmit, via a second backhaul interface link, traffic type information corresponding to the traffic type of the first uplink traffic to second network equipment of a second RAN, to be used by the second network equipment in reference to a configured traffic-aware full duplex sub band mapping to determine, based on the traffic type of the first uplink traffic, whether to suppress transmission by the second network equipment of downlink traffic during an uplink sub band of the first full duplex sub band pattern to be used by the first network equipment to receive the first uplink traffic.

Figure 10:
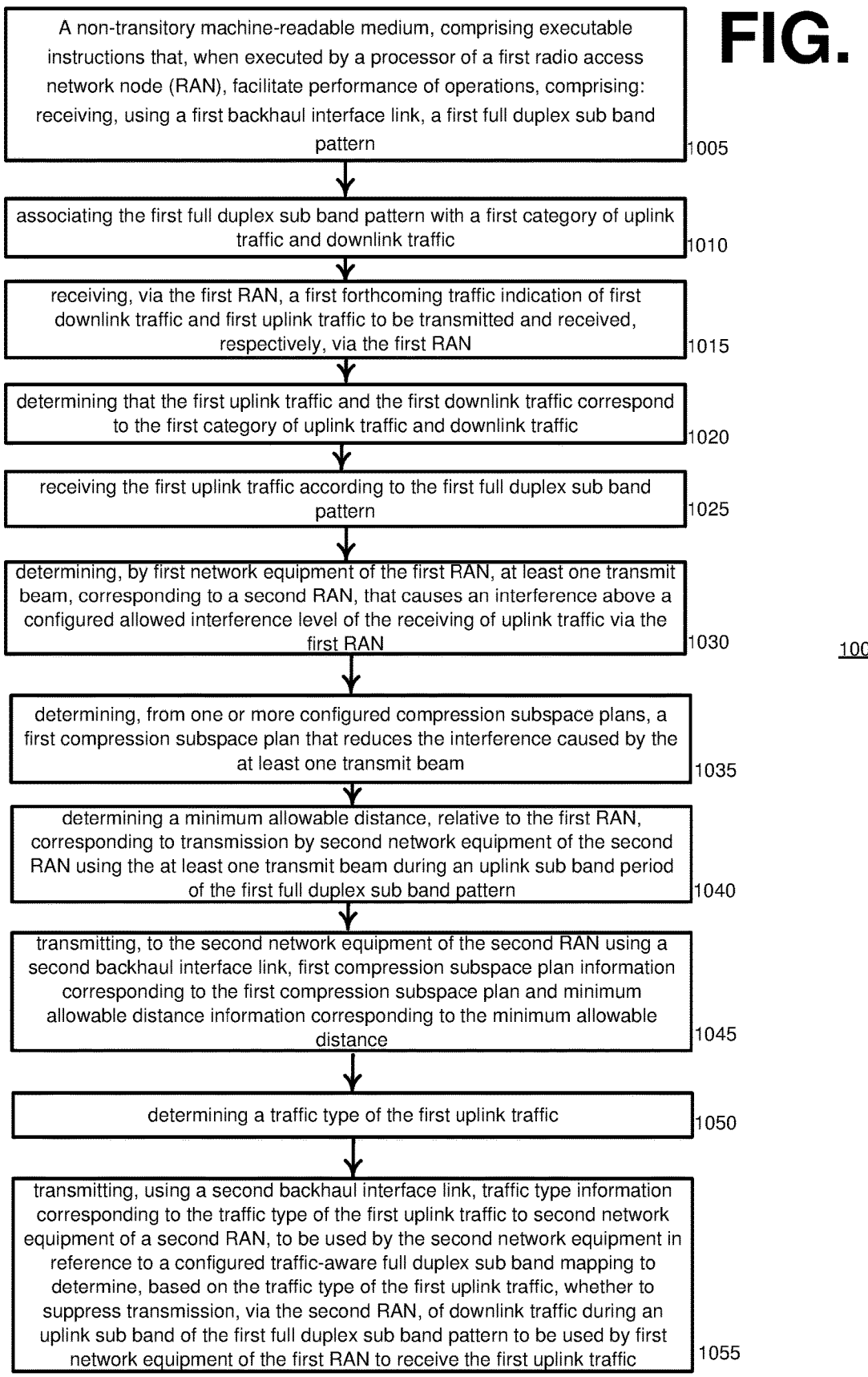
FIG. 10 illustrates a block diagram of an example non-transitory machine-readable medium embodiment.

Turning now to FIG. 10, the figure illustrates a non-transitory machine-readable medium 1000 comprising at block 1005 executable instructions that, when executed by a processor of a first radio access network node (RAN), facilitate performance of operations, comprising: receiving, using a first backhaul interface link, a first full duplex sub band pattern; at block 1010 associating the first full duplex sub band pattern with a first category of uplink traffic and downlink traffic; at block 1015 receiving, via the first RAN, a first forthcoming traffic indication of first downlink traffic and first uplink traffic to be transmitted and received, respectively, via the first RAN; at block 1020 determining that the first uplink traffic and the first downlink traffic corresponds to the first category of uplink traffic and downlink traffic; at block 1025 receiving the first uplink traffic according to the first full duplex sub band pattern; at block 1030 determining, by first network equipment of the first RAN, at least one transmit beam, corresponding to a second RAN, that causes an interference above a configured allowed interference level of the receiving of uplink traffic via the first RAN; at block 1035 determining, from one or more configured compression subspace plans, a first compression subspace plan that reduces the interference caused by the at least one transmit beam; at block 1040 determining a minimum allowable distance, relative to the first RAN, corresponding to transmission by second network equipment of the second RAN using the at least one transmit beam during an uplink sub band period of the first full duplex sub band pattern; at block 1045 transmitting, to the second network equipment of the second RAN using a second backhaul interface link, first compression subspace plan information corresponding to the first compression subspace plan and minimum allowable distance information corresponding to the minimum allowable distance; at block 1050 determining a traffic type of the first uplink traffic; and at block 1055 transmitting, using a second backhaul interface link, traffic type information corresponding to the traffic type of the first uplink traffic to second network equipment of a second RAN, to be used by the second network equipment in reference to a configured traffic-aware full duplex sub band mapping to determine, based on the traffic type of the first uplink traffic, whether to suppress transmission, via the second RAN, of downlink traffic during an uplink sub band of the first full duplex sub band pattern to be used by first network equipment of the first RAN to receive the first uplink traffic.

Figure 11:
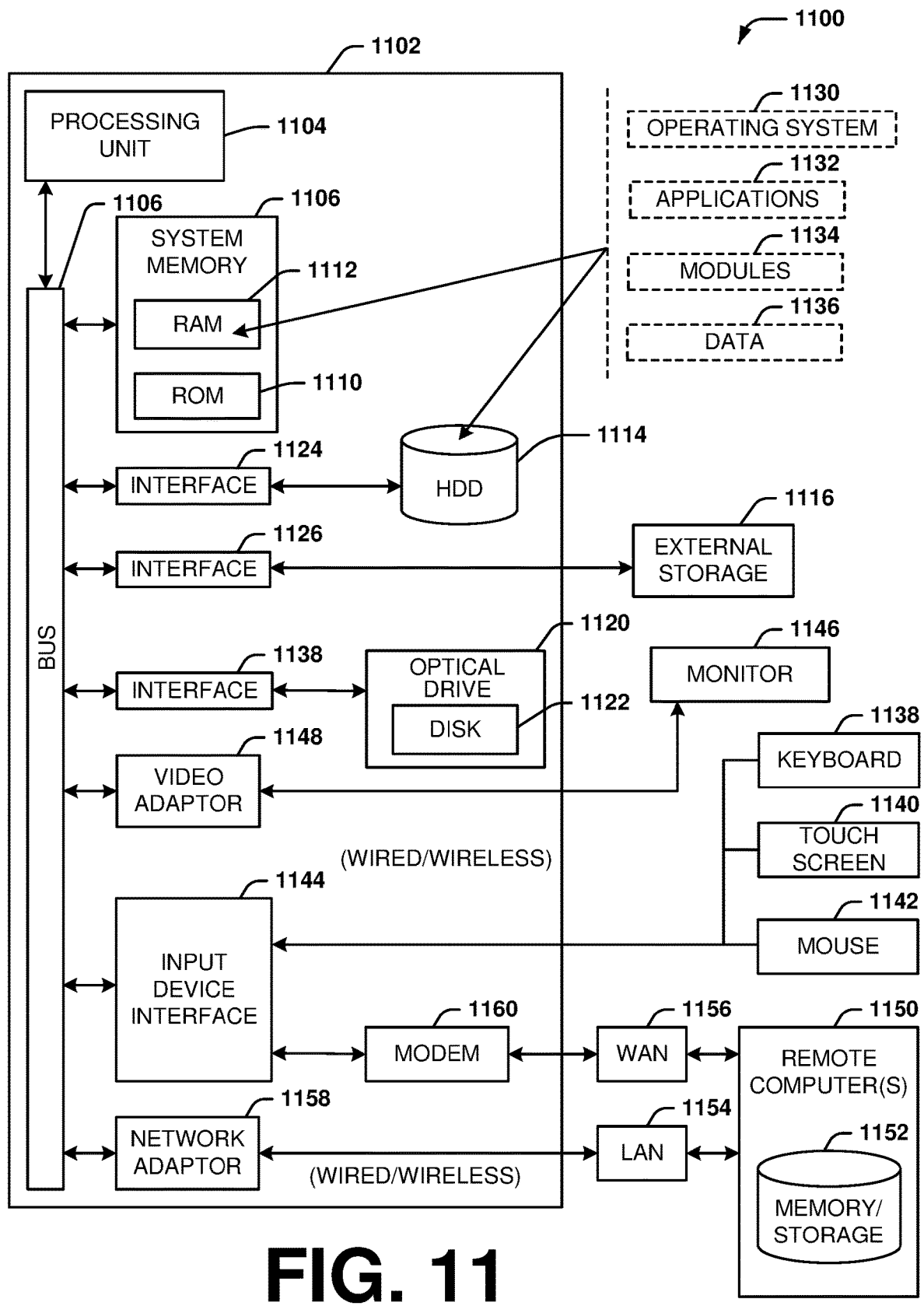
FIG. 11 illustrates an example computer environment.

In order to provide additional context for various embodiments described herein, FIG. 11 and the following discussion are intended to provide a brief, general description of a suitable computing environment 1100 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors and may include a cache memory. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

Computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid-state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can comprise a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 12:
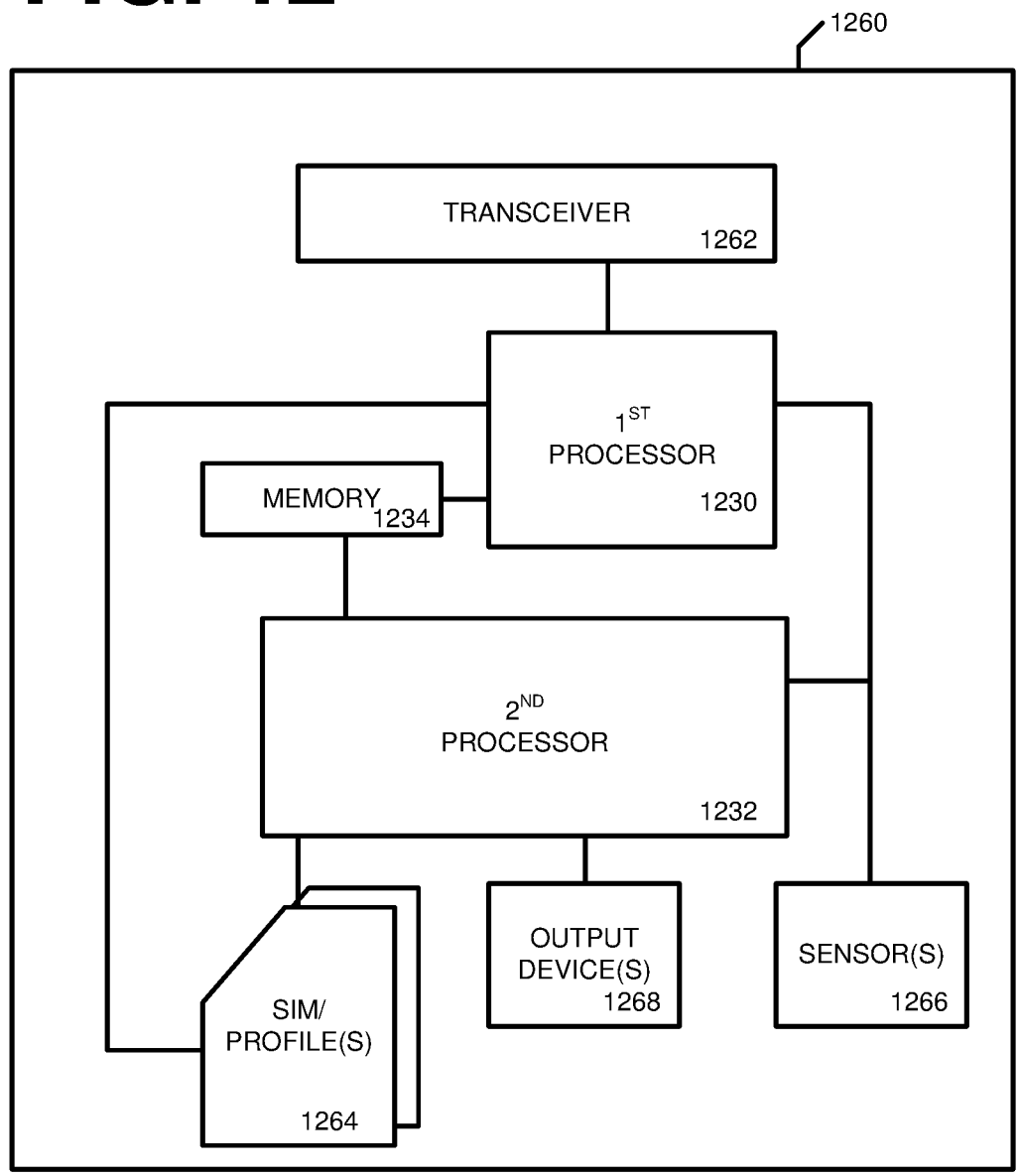
FIG. 12 illustrates a block diagram of an example wireless UE.

Turning now to FIG. 12, the figure illustrates a block diagram of an example UE 1260. UE 1260 may comprise a smart phone, a wireless tablet, a laptop computer with wireless capability, a wearable device, a machine device that may facilitate vehicle telematics, and the like. UE 1260 comprises a first processor 1230, a second processor 1232, and a shared memory 1234. UE 1260 includes radio front end circuitry 1262, which may be referred to herein as a transceiver, but is understood to typically include transceiver circuitry, separate filters, and separate antennas for facilitating transmission and receiving of signals over a wireless link, such as one or more wireless links 125, 135, or 137 shown in FIG. 1. Furthermore, transceiver 1262 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 12, UE 1260 may also include a SIM 1264, or a SIM profile, which may comprise information stored in a memory (memory 34 or a separate memory portion), for facilitating wireless communication with RAN 105 or core network 130 shown in FIG. 1. FIG. 12 shows SIM 1264 as a single component in the shape of a conventional SIM card, but it will be appreciated that SIM 1264 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1264 and another device, which may be a component of RAN 105 or core network 130 shown in FIG. 1). A SIM profile 1264 may also comprise identifying information that is unique to the SIM, or SIM profile, such as, for example, an International Mobile Subscriber Identity ("IMSI") or information that may make up an IMSI.

SIM 1264 is shown coupled to both the first processor portion 1230 and the second processor portion 1232. Such an implementation may provide an advantage that first processor portion 30 may not need to request or receive information or data from SIM 1264 that second processor 1232 may request, thus eliminating the use of the first processor acting as a 'go-between' when the second processor uses information from the SIM in performing its functions and in executing applications. First processor 1230, which may be a modem processor or baseband processor, is shown smaller than processor 1232, which may be a more sophisticated application processor, to visually indicate the relative levels of sophistication (i.e., processing capability and performance) and corresponding relative levels of operating power consumption levels between the two processor portions. Keeping the second processor portion 1232 asleep/inactive/in a low power state when UE 1260 does not need it for executing applications and processing data related to an application provides an advantage of reducing power consumption when the UE only needs to use the first processor portion 1230 while in listening mode for monitoring routine configured bearer management and mobility management/maintenance procedures, or for monitoring search spaces that the UE has been configured to monitor while the second processor portion remains inactive/asleep.

UE 1260 may also include sensors 1266, such as, for example, temperature sensors, accelerometers, gyroscopes, barometers, moisture sensors, and the like that may provide signals to the first processor 1230 or second processor 1232. Output devices 1268 may comprise, for example, one or more visual displays (e.g., computer monitors, VR appliances, and the like), acoustic transducers, such as speakers or microphones, vibration components, and the like. Output devices 1268 may comprise software that interfaces with output devices, for example, visual displays, speakers, microphones, touch sensation devices, smell or taste devices, and the like, that are external to UE 1260.

The following glossary of terms given in Table 1 may apply to one or more descriptions of embodiments disclosed herein.

TABLE 1

| Term | Definition |
| --- | --- |
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |
| WTRU | Wireless transmit receive unit |
| URLLC | Ultra reliable and low latency communication |
| CBR | Channel busy ratio |
| SCI | Sidelink control information |
| SBFD | Sub-band full duplex |
| CLI | Cross link interference |
| TDD | Time division duplexing |
| FDD | Frequency division duplexing |
| BS | Base-station |
| RS | Reference signal |
| CSI-RS | Channel state information reference signal |
| PTRS | Phase tracking reference signal |
| DMRS | Demodulation reference signal |
| BS | Base-station |
| gNB | General NodeB |
| PUCCH | Physical uplink control channel |
| PUSCH | Physical uplink shared channel |
| SRS | Sounding reference signal |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   receiving, by network equipment of a radio access network node (RAN) via a first backhaul interface link, a first full duplex sub band pattern;
   associating the first full duplex sub band pattern with a first category of uplink traffic and downlink traffic;
   receiving, by the network equipment, a first forthcoming traffic indication of first downlink traffic and first uplink traffic to be transmitted and received, respectively, via the RAN;

determining that the first uplink traffic and the first downlink traffic correspond to the first category of uplink traffic and downlink traffic; and receiving the first uplink traffic according to the first full duplex sub band pattern.

2. The method of claim 1, further comprising scheduling, by the network equipment, receiving and transmitting of the first uplink traffic and first downlink traffic, respectively, according to the first full duplex sub band pattern during a time division duplexing timing unit.

3. The method of claim 1, wherein the first full duplex sub band pattern is one of a group of full duplex sub band patterns received by the network equipment, and wherein the group of full duplex sub band patterns corresponds to different respective categories of uplink traffic and downlink traffic.

4. The method of claim 3, further comprising:

receiving, by the network equipment, a second forthcoming traffic indication of second downlink traffic and second uplink traffic to be transmitted and received, respectively, by the network equipment;

determining that the second uplink traffic and the second downlink traffic correspond to a second category of uplink traffic and downlink traffic; and receiving the second uplink traffic according to a second full duplex sub band pattern of the group of full duplex sub band patterns.

5. The method of claim 1, wherein the network equipment of the RAN is first network equipment of a first RAN, and further comprising:

generating a first selected full duplex sub band pattern indication indicating that the first network equipment of the first RAN determined that the first uplink traffic and the first downlink traffic corresponds to the first category of uplink traffic and downlink traffic; and transmitting, via a second backhaul interface link, the first selected full duplex sub band pattern indication to second network equipment of a second RAN to be used by the second network equipment in determining scheduling of transmission of downlink traffic from the second network equipment.

6. The method of claim 5, wherein the second backhaul interface link is a different backhaul interface link than the first backhaul interface link.

7. The method of claim 5, wherein the first selected sub band full duplex pattern indication comprises an identifier associated with the first full duplex sub band pattern.

8. The method of claim 5, wherein the first selected full duplex sub band pattern indication comprises an identifier associated at least one of: a first pattern periodicity corresponding to the first full duplex sub band pattern or a first pattern validity period corresponding to the first full duplex sub band pattern.

9. The method of claim 1, wherein the network equipment of the RAN is first network equipment of a first RAN, and further comprising:

determining, by the first network equipment, at least one transmit beam corresponding to second network equipment of a second RAN that causes an interference above a configured allowed interference level of the receiving of uplink traffic by the first network equipment;

determining, from one or more configured compression subspace plans, a first compression subspace plan that reduces the interference caused by the at least one transmit beam corresponding to the second network equipment;

determining a minimum allowable distance, relative to the first network equipment, corresponding to transmission by the second network equipment via the at least one transmit beam during an uplink sub band period of the first full duplex sub band pattern; and transmitting, to the second network equipment via a second backhaul interface link, first compression subspace plan information corresponding to the first compression subspace plan and minimum allowable distance information corresponding to the minimum allowable distance.

10. The method of claim 1, wherein the network equipment of the RAN is first network equipment of a first RAN, and further comprising:

determining a traffic type of the first uplink traffic; and transmitting, via a second backhaul interface link, traffic type information corresponding to the traffic type of the first uplink traffic to second network equipment of a second RAN, to be used by the second network equipment in reference to a configured traffic-aware full duplex sub band mapping to determine, based on the traffic type of the first uplink traffic, whether to suppress transmission, by the second network equipment, of downlink traffic during an uplink sub band of the first full duplex sub band pattern to be used by the first network equipment to receive the first uplink traffic.

11. A system, comprising:

a processor configured to:

receive, at first network equipment of a radio access network (RAN) via a first backhaul interface link, a first full duplex sub band pattern;

associate the first full duplex sub band pattern with a first category of uplink traffic and downlink traffic;

receive, by the first network equipment, a first forthcoming traffic indication of first downlink traffic and first uplink traffic to be transmitted and received, respectively, by the first network equipment;

determine that the first uplink traffic and the first downlink traffic correspond to the first category of uplink traffic and downlink traffic; and receive the first uplink traffic according to the first full duplex sub band pattern.

12. The system of claim 11, wherein the first full duplex sub band pattern is one of a group of full duplex sub band patterns received by the first network equipment, wherein the group of full duplex sub band patterns corresponds to different respective categories of uplink traffic and downlink traffic, and wherein the processor is further configured to:

receive, by the first network equipment, a second forthcoming traffic indication of second downlink traffic and second uplink traffic to be transmitted and received, respectively, by the first network equipment;

determine that the second uplink traffic and the second downlink traffic corresponds to a second category of uplink traffic and downlink traffic; and receive the second uplink traffic according to a second full duplex sub band pattern of the group of full duplex sub band patterns.

13. The system of claim 11, wherein the processor is further configured to:

generate a first selected full duplex sub band pattern indication indicating that the first network equipment determined that the first uplink traffic and the first downlink traffic corresponds to the first category of uplink traffic and downlink traffic; and transmit, via a second backhaul interface link, the first selected full duplex sub band pattern indication to second network equipment of a second RAN to be used by the second network equipment in determining scheduling of transmission of downlink traffic from the second network equipment.

14. The system of claim 11, wherein the processor is further configured to:
   determine, by the first network equipment, at least one transmit beam corresponding to a second RAN that causes an interference above a configured allowed interference level of the receiving of uplink traffic by the first network equipment;
   determine, from one or more configured compression subspace plans, a first compression subspace plan that reduces the interference caused by the at least one transmit beam corresponding to the second RAN;
   determine a minimum allowable distance, relative to the first RAN, corresponding to transmission by second network equipment of the second RAN via the at least one transmit beam during an uplink sub band period of the first full duplex sub band pattern; and
   transmit, to the second network equipment via a second backhaul interface link, first compression subspace plan information corresponding to the first compression subspace plan and minimum allowable distance information corresponding to the minimum allowable distance.

15. The system of claim 11, wherein the processor is further configured to:
   determine a traffic type of the first uplink traffic; and
   transmit, via a second backhaul interface link, traffic type information corresponding to the traffic type of the first uplink traffic to second network equipment of a second RAN, to be used by the second network equipment in reference to a configured traffic-aware full duplex sub band mapping to determine, based on the traffic type of the first uplink traffic, whether to suppress transmission by the second network equipment of downlink traffic during an uplink sub band of the first full duplex sub band pattern to be used by the first network equipment to receive the first uplink traffic.

16. A non-transitory machine-readable medium, comprising executable instructions that, when executed by a processor of a first radio access network node (RAN), facilitate performance of operations, comprising:
   receiving, using a first backhaul interface link, a first full duplex sub band pattern;
   associating the first full duplex sub band pattern with a first category of uplink traffic and downlink traffic;
   receiving, via the first RAN, a first forthcoming traffic indication of first downlink traffic and first uplink traffic to be transmitted and received, respectively, via the first RAN;
   determining that the first uplink traffic and the first downlink traffic correspond to the first category of uplink traffic and downlink traffic; and
   receiving the first uplink traffic according to the first full duplex sub band pattern.

17. The non-transitory machine-readable medium of claim 16, wherein the first full duplex sub band pattern is one of a group of full duplex sub band patterns received via the first RAN, wherein the group of full duplex sub band patterns correspond to different respective categories of uplink traffic and downlink traffic, and wherein the operations further comprise:
   receiving, via the first RAN, a second forthcoming traffic indication of second downlink traffic and second uplink traffic to be transmitted and received, respectively, via the first RAN;
   determining that the second uplink traffic and the second downlink traffic corresponds to a second category of uplink traffic and downlink traffic; and
   receiving the second uplink traffic according to a second full duplex sub band pattern of the group of full duplex sub band patterns.

18. The non-transitory machine-readable medium of claim 16, wherein the operations further comprise:
   generating a first selected full duplex sub band pattern indication indicating that first network equipment of the first RAN determined that the first uplink traffic and the first downlink traffic corresponds to the first category of uplink traffic and downlink traffic; and
   transmitting, using a second backhaul interface link, the first selected full duplex sub band pattern indication, via a second RAN, to be used by second network equipment of the second RAN in determining a transmission schedule applicable to downlink traffic via the second RAN.

19. The non-transitory machine-readable medium of claim 16, wherein the operations further comprise:
   determining, by first network equipment of the first RAN, at least one transmit beam, corresponding to a second RAN, that causes an interference above a configured allowed interference level of the receiving of uplink traffic via the first RAN;
   determining, from one or more configured compression subspace plans, a first compression subspace plan that reduces the interference caused by the at least one transmit beam;
   determining a minimum allowable distance, relative to the first RAN, corresponding to transmission by second network equipment of the second RAN using the at least one transmit beam during an uplink sub band period of the first full duplex sub band pattern; and
   transmitting, to the second network equipment of the second RAN using a second backhaul interface link, first compression subspace plan information corresponding to the first compression subspace plan and minimum allowable distance information corresponding to the minimum allowable distance.

20. The non-transitory machine-readable medium of claim 16, wherein the operations further comprise:
   determining a traffic type of the first uplink traffic; and
   transmitting, using a second backhaul interface link, traffic type information corresponding to the traffic type of the first uplink traffic to second network equipment of a second RAN, to be used by the second network equipment in reference to a configured traffic-aware full duplex sub band mapping to determine, based on the traffic type of the first uplink traffic, whether to suppress transmission, via the second RAN, of downlink traffic during an uplink sub band of the first full duplex sub band pattern to be used by first network equipment of the first RAN to receive the first uplink traffic.

* * * * *